United States Patent
Pieper et al.

(10) Patent No.: US 8,180,681 B2
(45) Date of Patent: May 15, 2012

(54) AUTOMATED ENTITLEMENT MANAGEMENT METHOD AND APPARATUS FOR CAPTURING MAINTENANCE RENEWALS REVENUES

(75) Inventors: Tobid Pieper, Orinda, CA (US); Paul Martinelli, Berkeley, CA (US); Richard Northing, Alamo, CA (US)

(73) Assignee: Intraware, Inc., Orinda, CA (US)

( * ) Notice: Subject to any disclaimer, the term of this patent is extended or adjusted under 35 U.S.C. 154(b) by 926 days.

(21) Appl. No.: 12/121,704

(22) Filed: May 15, 2008

(65) Prior Publication Data

US 2008/0215492 A1 Sep. 4, 2008

Related U.S. Application Data

(63) Continuation-in-part of application No. 11/608,201, filed on Dec. 7, 2006, which is a continuation of application No. 10/835,688, filed on Apr. 29, 2004, which is a continuation-in-part of application No. 10/635,840, filed on Aug. 5, 2003, now abandoned.

(51) Int. Cl.
*G06Q 30/00* (2006.01)

(52) U.S. Cl. .......................................... 705/26.1; 705/59
(58) Field of Classification Search ............... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 5,208,765 A | 5/1993 | Turnbull | |
| 5,835,911 A * | 11/1998 | Nakagawa et al. | 1/1 |
| 5,867,799 A | 2/1999 | Lang et al. | |
| 5,903,721 A | 5/1999 | Sixtus | |
| 5,931,917 A | 8/1999 | Nguyen et al. | |
| 5,950,173 A | 9/1999 | Perkowski | |
| 5,970,490 A | 10/1999 | Morgenstern | |
| 6,006,191 A | 12/1999 | DiRienzo | |
| 6,021,202 A | 2/2000 | Anderson et al. | |
| 6,032,159 A | 2/2000 | Rivlin | |
| 6,081,518 A | 6/2000 | Bowman-Amuah | |
| 6,122,403 A | 9/2000 | Rhoads | |
| 6,163,772 A | 12/2000 | Kramer et al. | |

(Continued)

FOREIGN PATENT DOCUMENTS

EP 467584 A2 1/1992

(Continued)

OTHER PUBLICATIONS

Giuseppe Visaggio "Value-based decision model for renewal processes in software maintenance", Annals of Software Engineering 9 (2000) pp. 215-233.*

(Continued)

*Primary Examiner* — Naeem Haq
(74) *Attorney, Agent, or Firm* — Michael A. Glenn; Glenn Patent Group

(57) ABSTRACT

The presently preferred embodiment of the invention provides a method and apparatus that enables software publishers and other sellers of subscription services. e.g. subscriptions, such as maintenance or license programs, to track when the subscription period for each customer expires, to inform interested contacts at the customer proactively that a renewal for their subscription is coming due, and to provide a way for those contacts at the customer to purchase a renewal of their subscription program.

24 Claims, 22 Drawing Sheets

U.S. PATENT DOCUMENTS

| | | | |
|---|---|---|---|
| 6,167,382 | A | 12/2000 | Sparks et al. |
| 6,167,406 | A | 12/2000 | Hoskins et al. |
| 6,178,409 | B1 | 1/2001 | Weber et al. |
| 6,226,618 | B1 | 5/2001 | Downs et al. |
| 6,253,027 | B1 | 6/2001 | Weber et al. |
| 6,269,080 | B1 | 7/2001 | Kumar |
| 6,289,382 | B1 | 9/2001 | Bowman-Amuah |
| 6,304,915 | B1 | 10/2001 | Nguyen et al. |
| 6,332,135 | B1 | 12/2001 | Conklin et al. |
| 6,345,256 | B1 | 2/2002 | Milsted et al. |
| 6,345,288 | B1 | 2/2002 | Reed et al. |
| 6,374,402 | B1 | 4/2002 | Schmeidler et al. |
| 6,389,403 | B1 | 5/2002 | Dorak et al. |
| 6,418,421 | B1 | 7/2002 | Hurtado et al. |
| 6,418,441 | B1 | 7/2002 | Call |
| 6,438,594 | B1 | 8/2002 | Bowman-Amuah |
| 6,442,547 | B1 | 8/2002 | Bowman-Amuah |
| 6,442,748 | B1 | 8/2002 | Bowman-Amuah |
| 6,449,588 | B1 | 9/2002 | Bowman-Amuah |
| 6,457,017 | B2 | 9/2002 | Watkins et al. |
| 6,477,665 | B1 | 11/2002 | Bowman-Amuah |
| 6,484,149 | B1 | 11/2002 | Jammes et al. |
| 6,493,678 | B1 | 12/2002 | Foster et al. |
| 6,519,571 | B1 | 2/2003 | Guheen et al. |
| 6,523,027 | B1 | 2/2003 | Underwood |
| 6,529,948 | B1 | 3/2003 | Bowman-Amuah |
| 6,536,037 | B1 | 3/2003 | Guheen et al. |
| 6,539,396 | B1 | 3/2003 | Bowman-Amuah |
| 6,587,837 | B1 | 7/2003 | Spagna et al. |
| 6,615,217 | B2 | 9/2003 | Rosensteel, Jr. et al. |
| 6,629,135 | B1 | 9/2003 | Ross, Jr. et al. |
| 6,678,695 | B1 | 1/2004 | Bonneau et al. |
| 6,834,282 | B1 | 12/2004 | Bonneau et al. |
| 6,934,693 | B2 | 8/2005 | Stefik et al. |
| 7,080,070 | B1 | 7/2006 | Gavarini |
| 7,110,965 | B1 | 9/2006 | Pierce |
| 7,110,984 | B1 | 9/2006 | Spagna et al. |
| 7,120,800 | B2 | 10/2006 | Ginter et al. |
| 7,181,017 | B1 | 2/2007 | Nagel et al. |
| 7,316,032 | B2 | 1/2008 | Tayebi et al. |
| 7,831,515 | B2 * | 11/2010 | Martinelli et al. ............... 705/59 |
| 7,958,163 | B2 | 6/2011 | Brentano et al. |
| 8,015,114 | B1 * | 9/2011 | Nachenberg .................... 705/59 |
| 2001/0025377 | A1 | 9/2001 | Hinderks |
| 2001/0034763 | A1 | 10/2001 | Jacobs et al. |
| 2001/0054042 | A1 | 12/2001 | Watkins et al. |
| 2002/0032027 | A1 | 3/2002 | Kirani et al. |
| 2002/0042835 | A1 | 4/2002 | Pepin et al. |
| 2002/0069214 | A1 | 6/2002 | Smith et al. |
| 2002/0072967 | A1 | 6/2002 | Jacobs et al. |
| 2002/0103737 | A1 | 8/2002 | Briere |
| 2002/0107809 | A1 * | 8/2002 | Biddle et al. .................... 705/59 |
| 2002/0138441 | A1 | 9/2002 | Lopatle |
| 2003/0009425 | A1 | 1/2003 | Stonedahl et al. |
| 2003/0023963 | A1 | 1/2003 | Birkholz et al. |
| 2003/0050822 | A1 | 3/2003 | Hoffman et al. |
| 2003/0050832 | A1 | 3/2003 | Jacobs et al. |
| 2003/0050859 | A1 | 3/2003 | Rodriguez et al. |
| 2003/0053475 | A1 | 3/2003 | Veeraraghavan et al. |
| 2003/0060228 | A1 | 3/2003 | Capers et al. |
| 2003/0074249 | A1 | 4/2003 | Hoffman et al. |
| 2003/0095550 | A1 | 5/2003 | Lewis et al. |
| 2003/0096600 | A1 | 5/2003 | Lewis et al. |
| 2003/0140041 | A1 | 7/2003 | Rosensteel et al. |
| 2003/0145018 | A1 | 7/2003 | Hitchock et al. |
| 2003/0146977 | A1 | 8/2003 | Vale et al. |
| 2003/0149738 | A1 | 8/2003 | Jacobs et al. |
| 2003/0158742 | A1 | 8/2003 | Ford et al. |
| 2003/0167181 | A1 | 9/2003 | Lundberg et al. |
| 2003/0217011 | A1 | 11/2003 | Peinado et al. |
| 2003/0236886 | A1 | 12/2003 | Oren et al. |
| 2004/0024688 | A1 * | 2/2004 | Bi et al. ......................... 705/37 |
| 2004/0249756 | A1 | 12/2004 | Garibay et al. |
| 2005/0033652 | A1 * | 2/2005 | Brentano et al. ................ 705/26 |
| 2005/0086501 | A1 | 4/2005 | Woo et al. |
| 2005/0108173 | A1 | 5/2005 | Stefik et al. |
| 2006/0080742 | A1 | 4/2006 | Nakayama et al. |
| 2006/0089912 | A1 | 4/2006 | Spagna |
| 2006/0277122 | A1 | 12/2006 | Shear et al. |
| 2007/0078721 | A1 * | 4/2007 | Dandekar et al. ............... 705/26 |
| 2008/0071686 | A1 | 3/2008 | Tayebi et al. |
| 2008/0107264 | A1 | 5/2008 | Van Wie et al. |
| 2011/0184880 | A1 * | 7/2011 | Neumann et al. ............. 705/344 |

FOREIGN PATENT DOCUMENTS

| | | | |
|---|---|---|---|
| EP | 467584 | A3 | 1/1992 |
| EP | 1091304 | A2 | 4/2001 |
| EP | 1091304 | A3 | 4/2001 |
| EP | 1126396 | A2 | 8/2001 |
| EP | 1126674 | A2 | 8/2001 |
| EP | 1126674 | A3 | 8/2001 |
| JP | 11338745 | | 12/1999 |

OTHER PUBLICATIONS

Screen captures of Intraware.com website obtained via www.archive. org and dates Aug. 2, 2002.

Intraware.com, screen captures Sep. 8, 2005.

Aoyama, et al.; *A Commerce Broker of Software Components and Its Experience*; Nov. 1988; Dept of Inf. & Electon. Eng. Niigata Univ. Japan.

Asokan, N.; *Fairness in Electronic Commerce*; 1998; a Thesis Presented to the Univ. of Waterloo in Fulfilment of the Thesis Requirement for the Degree of Doctor of Philosophy in Computer Science.

Joeris, G.; *Characterization of Integrated Process and Product Management*; Intelligent Systems Dept., Center for Computing Technologies.

Joeris, G.; *Change Management Needs Integrated Process and Configuration Management*; Intelligent Systems Dept. Center for Computing Technology Univ. of Bremen.

Kreuger, P.; *Applications of Partial Inductive Definitions*; Apr. 1992; Swedish Institute of Computer Science; Conclusions from Some Projects Run at SICS KBS-Lab 1986-1992.

Pralle, U.; *Driving the Software Release Process with Shape*; Technische Universitat Berlin.

Schill, A.; *Distributed Platforms*; Dresden Univ. of Technology, Dept. of Computer Science.

Danzig, et al; *A Case for Caching File Objects Inside Internetworks*; Mar. 1993; Univ. of Colorado.

Khalidi, et al.; *The Spring Virtual Memory System*; Feb. 1993; Sun Microsystems Laboratory.

Diot, et al. *Multimedia Applications Should Be Adaptive*; INRIA, Sophia Antipolis, France.

Braun, et al.; *Protocol Implementation Using Integrated Layer Processing*; INRIA, Sophia Antipolis, France.

Brockners, F.; *Bulk multicast data transfer—towards the integration of FEC and ARQ using a lightweight feedback control tree*; Jul. 1997: Center for Parallel Computing, Univ. of Cologne, Germany.

Czajkowski, et al.;*JRes: A Resource Accounting Interface for Java*; Oct. 1998, Proceedings of ACM OOPLSA Conference Vancouver, BC.

Weissman, J.; *Smart File Objects: A Remote File Access Paradigm*; 1999; Division of Computer Science, Univ. of Texas.

Donahoo, et al; *Multiple-Channel Multicast Scheduling for Scalable Bulk-data Transport*; Dept. of Computer Science, School of Engineering and Computer Science, Baylor Univ. and Networking and Telecommunications Group, College of Computing, Georgia Institute of Technology.

Padmanabhan, et al.; *The Content and Access Dynamics of a Busy Web Site: Finding and Implications*; Aug. 2000; Proceedins of ACM SIGCOMM 2000, Stockholm Sweden.

Tham, et al; *Minimizing Transmission Costs Through Adaptive Marking in Differentiated Services Networks*; 2002; Management of Multimedia on the Internet: Springer-Verlag; Berlin, Germany.

Cooper, C.S.; *Managed File Distribution on the Universe Network*; 1984; Computer Communication Review, vol. 14 No. 2 pp. 10-17.

Daka, et al.; *A High Performance broadcast File Transfer Protocol*; 1988; Computer Communication Review, vol. 18, No. 4 pp. 274-281.

Vicisano, et al.; *One to Many Reliable Bulk-Data Transfer in the Mbone*; Jun. 12-13, 1997; Proceedings of the Third International Workshop on High Performance Protocol Architectures HIPPARCH '97, Uppsala, Sweden.

Pesce, N.A.; *Bell of Pennsylvania Bulk File Transfer Project*; 1987; Interface '87 Papers Proceedings pp. 40-47; McGraw Hill Inf. Syst.

Wilder, et al; *Effectiveness of Congestion Avoidance: A Measurement Study*; 1992; IEEE INFOCOM '92 Conference on Computer Communications. Eleventh Annual Joint Conference of the IEEE Computer and Communications Societies pp. 2378-2390, vol. 3.

Yamasaki, M.J.;*Special Purpose User-Space Network Protocols*; 1988; USENIX Assoc. Winter Conference Dallas, Proceedings pp. 63-69, USENIX Assoc. Berkeley CA.

*Netopia Looks to Intraware to Provide Cost Effective Software Update and Deliver Service to Improve It Efficiencies*; Apr. 11, 2001; Business Editors, Business Wire.

*Asera Launches Web-Based Customer Support Solution with Integrated Intraware SubscriberNet Download Portal*; Feb. 27, 2002; Business Editors, Business Wire.

Microsoft Computer Dictionary; Second Edition, copyright 1994.

Intraware Web Pages dated Jun. 4, 2002 obtained using www.archive.org.

"Netview File Transfer Program"; Dec. 2004; IBM, pp. 1-176.

\* cited by examiner

| Accounts & Members | Entitlements | Product Management | Transactions | Setup | | |
|---|---|---|---|---|---|---|
| Search Catalog • Search Products • Search Files • Download Catalog • Configure | | | | | | |

Quick Search Catalog    Catalog Item Name: [ ]    Catalog Item ID: [ ] Go

Quick Search Products    Product Name: [ ]    Product ID: [ ] Go

Quick Search Files    File Description: [ ]    File ID: [ ] Go

Catalog Item View

View Catalog Item      HELP

To modify this catalog item use the buttons in the catalog item navigation bar above.

Catalog ID:    CCC_DATA_JUNE
Intraware Catalog Item ID:    74580
Catalog Item Name:    CCC Pathways Data Upgrade from May to June 2003
Catalog Item Status:    Active
Catalog Item Type:    Normal
Subscription:    Yes
Temporary:    No
Default Duration:    1 year 0 months 0 days
Default Max Download Limit:    No
If yes, What is the limit?
Catalog Manufacturer:    CCC Information Services
Catalog Product Line:    CCC Pathways
License Group:
Support Agreement:

Products in this Catalog Item

[1-1]

| Intraware Product ID | Product ID | Product Name | Version | Effective Date | Expiration Date |
|---|---|---|---|---|---|
| 7459 | CCC_PATHWAYS_JUNE_UPDATE | CCC Pathways June Update | June 2003 | 06/01/2003 | 09/01/2003 |

[1-1]

Add a Catalog Item

To add a new catalog item fill out the form below. Clicking the Add Catalog Item button will add the new catalog item and display the new catalog item in view mode. Clicking the Submit & Add Another Catalog Item button will add the catalog item and then return to the Add a Catalog Item page. To add products to this new catalog item click the Submit & Continue to Add Product button. To associated already existing products to this new catalog item click the Submit & Continue to Associate Product button. [* denotes required.]

Catalog Item ID:*
Catalog Item Name:*
Catalog Item Type:*  Normal ▼
Subscriptor:*  ⦿ Yes  ○ No
Temporary:*  ○ Yes  ⦿ No
Default Duration:*  [1 ▼] years  [0 ▼] months  [0 ▼] days
Default Max Download Limit:  ○ Yes  ⦿ No
If yes, What is the limit?
Catalog Manufacturer:*  ▼
Catalog Product Line:*  OR Enter Product Line ID:
                        None
                        None
License Group:
Support Agreement:

| Add Catalog Item | Submit & Add Another Catalog Item | Submit & Continue to Add Product | Submit & Continue to Associate Product |

| | |
|---|---|
| Product ID: | avid_test |
| Intaware Product ID: | 74033 |
| Product Name: | Avid Download Test |
| Version: | 1.0 |
| Effective Date: (mm/dd/yyyy) | 05/28/2003 |
| Expiration Date: (mm/dd/yyyy) | 06/28/2003 |
| | Avid |
| Product Manufacturer: | Avid Demo (58411) |
| Product Line: | |
| End User License Agreement: | |
| License Group: | |
| Download Instructions: | |
| Owner?: | Yes |
| Physical Distribution Available: | No |
| FLEXlm Feature Name: | |
| FLEXlm Version: | |

Export Compliance

| | |
|---|---|
| ECCN: | NO_EXPORT |
| ENC: | |
| CCATS: | |

File in this Product

[1-1]

| Intraware File ID | File ID | File Name | File Description | File Size(bytes) | Sort Order | Ignore Download Limit? | Last date Image Uploaded |
|---|---|---|---|---|---|---|---|
| 143071 | avid_test | avid_test.zip | Avid Download Test File | 223212689 | | No | 05/28/2003 |

Add a Product

To add a new product fill out the form below. Clicking the Add Product button will add the new product and display the new product in view mode. Clicking the Submit & Add Another Product button will add the product and then return to the Add a Product page. To add files to this new product click the Submit & Continue to Add File button. To associate already existing files to this new product click the Submit & Continue to Associate File button. To create a catalog item that uses the same information entered for this product click the Submit & Copy Product to Catalog Item button. [* denotes required.]

Product ID:

Product Name:*

Version:

Effective Date:* 07/17/2003
(mm/dd/yyyy)

Expiration Date:*
(mm/dd/yyyy)

Product Manufacturer:*

Product Line:*                    OR Enter Product Line ID:

End User License Agreement:

License Group:

Download Instructions:

Physical Distribution Available:*  ○ Yes  ● No

FLEXlm Feature Name:

FLEXlm Version:

*(rotated screenshot of Demo SubscribeNet Manager interface for Chris Peil showing View File page with fields: File ID, Intraware File ID: 92731, File Description: E-FORM NV MV CONTRACTS.DOC, File Name: Compliance Solution Alert - LEM(NV), File Status: NOT_LOADED, Owner?: Yes, File Size(bytes):, MD5 CheckSum: d418cd9800b204e980098ccf8427e, Last Date Image Uploaded:, Last Retrieved From Location:, Content Detail: "This optional 'Content Detail' field allows you to include further information about the specific file download." Navigation tabs include Accounts & Members, Entitlements, Product Management, Transactions, Setup; sub-tabs: Search Catalog, Search Products, Search Files, Download Catalog, Configure. Quick Search Catalog, Quick Search Products, Quick Search Files with Go buttons. Labeled 1300.)*

FIG. 14

AUTOMATED ENTITLEMENT MANAGEMENT METHOD AND APPARATUS FOR CAPTURING MAINTENANCE RENEWALS REVENUES

CROSS REFERENCE TO RELATED APPLICATIONS

This application is a continuation-in-part of U.S. patent application Ser. No. 11/608,201, filed Dec. 7, 2006, for Method and System For Managing Digital Goods, which is a continuation of U. S. patent application Ser. No. 10/835,688 filed Apr. 29, 2004, which is a continuation-in-part of U. S. patent application Ser. No. 10/635,840, filed Aug. 5, 2003, now abandoned each of which is incorporated herein in its entirety by this reference thereto.

BACKGROUND OF THE INVENTION

1. Technical Field

The invention relates to on-line publication of software. More particularly, the invention relates to an automated entitlement management method and apparatus for capturing maintenance renewals revenues.

2. Description of the Prior Art

Digital delivery has emerged as an efficient and profitable method of distributing digital goods such as software. While some suppliers of digital goods offer simple downloads from their web sites, these services provide only limited value to the supplier and the supplier's customers. There is a growing demand from end-users for increased services and from suppliers for better management and control of the complete delivery process. Increasingly, digital goods involve frequent updates, bug fixes, patches, and release notifications, resulting in exceedingly complex product relationships. Modeling/representing and managing these complex relationships poses a formidable challenge to digital goods suppliers.

K. Milsted, C. Kindell, Q. Qong, Automated method and apparatus to package digital content for electronic distribution using the identity of the source content, U.S. Pat. No. 6,345,256 (Feb. 5, 2002) describe a system and related tools for secure delivery and rights management of digital assets. While Milsted, et al. appear to recognize the complex product relationships associated with digital goods, they propose no solutions for modeling and managing the relationships, focusing instead on secure delivery and rights management.

W. Foster, C. Tselebis, Method, apparatus and system for merchandising related applications, U.S. Pat. No. 6,493,678 (Dec. 10, 2002) describe a system and method for organizing product line data, including product hierarchies and time horizons, for use across a variety of distribution channels. While the Foster teachings recognize the importance of managing product data, the solution they provide is essentially a streamlined method of producing a static, non-interactive product line document. The system lacks the capability of interactively distributing actual product to the customer or end-user according to associated entitlements or orders.

J. Ogilvie, Automatic broker tools and techniques, U.S. Pat. No. 6,547,134 (Apr. 15, 2003) describes methods and systems for facilitating electronic commerce in digital goods, such as digitized musical works, software or electronic documents. While the Ogilvie teachings are related to distribution of digital goods, they concern themselves primarily with successful completion of transactions for the sale of digital goods in which buyer and seller are satisfied with the end result. Complex product relationships or the importance of modeling and managing them are not recognized.

R. Reisman, Method and system for distributing updates by presenting directory of software available for user installation that is not already installed on user station, U.S. Pat. No. 6,557,054 (Apr. 29, 2003) provides a method and corresponding system for distributing updates for a plurality of different products to a plurality of uncoordinated user stations via a non-proprietary network. The central element of the described system consists of a software object, essentially a file transfer application, residing on each user station that establishes communication with a server to download updates of information products installed on the user station. A user interface is provided so that the user may view a directory of items available on the server and select from among the items available. Alternatively, examination of the directory and download may be automated. While Reisman provides a system that simplifies the process of locating and downloading digital goods, even recognizing the complex product relationships involved in distribution of digital goods, little attention is paid to methods for managing and modeling the relationships, or management of entitlements to the goods themselves.

There exists, therefore, a need in the art for a method and system of managing digital goods that would allow vendors to model and manage the complex product relationships typically involved with distribution of digital goods, particularly as related to electronic distribution of digital goods. For example, today software publishers and other sellers of subscription programs typically use a combination of automated and manual solutions to address the problem of capturing software maintenance renewal revenue. The information about the customer, the subscription programs they have purchased, and the effective dates of such programs are stored in corporate systems, such as implemented by enterprise resource planning software (ERP), as offered by such companies as SAP, Peoplesoft, Oracle, and Softrax, or customer relations management software (CRM), as offered by such companies as Salesforce.com, Siebel, and Remedy. Communications to customers regarding upcoming renewal of their subscription program are conducted manually. Manual steps typically include the following:

- Extraction of relevant subscription data from the ERP and CRM systems.
- Manual manipulation of data to obtain renewals information.
- Running reports to identify customers who have subscription renewals coming due in the near future.
- Manual creation of emails or hard copy communications to customers.
- Manual creation of follow-up emails or hard copy communications.
- Transactions completed by sales representative.

In addition, the only customer contact information that is typically available is that of the original purchaser of the subscription, and not that of other relevant contacts who might be more significantly impact in the event that the subscription is not renewed.

For software publishers that use a service, such as Intraware's current SubscribeNet service, the information about the customer, the subscription programs they have purchased, and the effective dates of such programs is recorded using an entitlement management module. This information includes contact information for the original purchaser of the subscription program, along with other contacts that have been added since the original purchase. Additional contacts typically include the end users of the subscription program, and are added either by the software publisher or by an administrative user from the customer. All contacts associated with a single purchasing customer are associated with a single customer record, or account. These multiple contacts, particularly those that are the end users of the subscription program represent the ideal target prospect for a subscription renewal sale.

The customer and subscription program information retained in the entitlement management module is used in an automated way by software publishers that use such system to communicate to their customer base automatically about the availability of products that are accessible only to those customers that have valid subscriptions and/or maintenance programs. However, information regarding upcoming renewals must be obtained manually or semi-manually from a separate, reporter module; and communications to customer contacts regarding upcoming renewal of their subscription program are conducted manually.

The state of the art use of multiple systems and a combination of automated and manual processes has the following challenges and disadvantages:

Introduction of errors. As data are passed from one system to another, or between systematized and manual processes, the likelihood of the inadvertent introduction of an error increases. Errors may result in communication of inaccurate renewals information to customers and may ultimately result in lost revenues and increased costs.

Unnecessary cost overheads. The use of manual processes inevitably introduces unnecessary costs because human resources are used to retrieve subscription renewals information and to communicate with customers.

Poor customer experience or perception. In today's consumer-focused, electronic-oriented world, customers have high expectations around the accuracy and timeliness of communications from their vendors. Communications that rely on manual processes and human interactions may not demonstrate to the customer that the software publisher has optimized processes, leading to concerns about product quality and commitment.

SUMMARY OF THE INVENTION

The invention provides a method and system for management of digital goods. The invention is particularly suited for modeling and managing complex product relationships necessitated by fixed-duration, subscription, or contract-based electronic distribution of digital goods, among them software products and other digital products such as e-books and digitized images. Using a variety of interactive tools provided by the invention, the digital goods vendor creates a product hierarchy based on associations, or relationships among a collection of primary objects. One embodiment of the invention includes one or more of the following objects:

Entitlements: equivalent to an order, subscription, or contract, grants an end user customer access to a vendor's digital goods. 'Entitlements' also specify such terms as account, quantity and effective date. An 'Entitlement' is typically associated with one or more 'Catalog items';

Catalog items: equivalent to price list items, represent each of a vendor's individual products, for example a product or a maintenance agreement. A 'Catalog item' is typically associated with one or more 'Products';

Products: equivalent to a product release, represent actual deliverables, for example, a specific version of a product. A 'Product' is typically associated with one or more 'Files'; and Files: 'Files' include the actual data objects that the end user downloads, for example, the installation executable for a particular platform.

Ideally, the resulting product hierarchy mirrors the marketing descriptions and organization of the vendor's product set. After the hierarchy is created, the vendor, again by way of interactive tools provided by the invention, uploads the individual files that make up the various 'Products' for download by end users, typically customers of the digital goods vendor.

In a preferred embodiment, a system operator implements the invention across a publicly accessible network such as the Internet. Each digital goods vendor is hosted by the system operator, typically on a subscription basis. Using the invention, each subscribing digital goods vendor is able to provide each of their customer accounts a personalized software maintenance portal that may be branded to the vendor, integrating seamlessly with any other of the vendor's network presences, for example, a web site.

In a particularly significant embodiment, the invention provides a method and apparatus that enables software publishers and other sellers of subscription services, e.g. subscriptions, such as maintenance or license programs, to track when the subscription period for each customer expires, to inform interested contacts at the customer proactively that a renewal for their subscription is coming due, and to provide a way for those contacts at the customer to purchase a renewal of their subscription program.

BRIEF DESCRIPTION OF THE DRAWINGS

Figure 2:
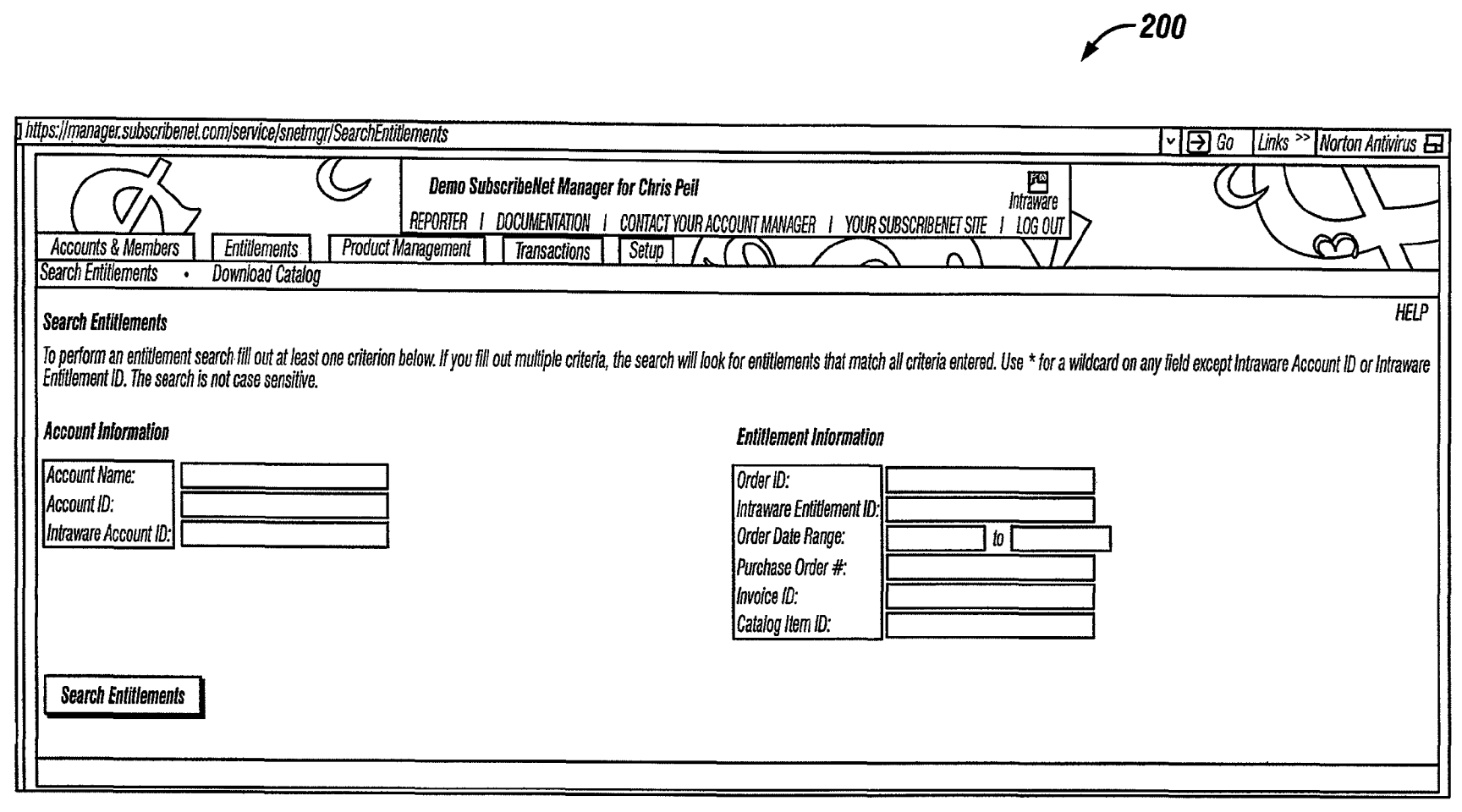

FIG. 2 shows a user interface for searching Entitlements from the system of FIG. 1;

FIG. 3 shows a user interface for selecting an account to entitle from the system of FIG. 1;

Figure 4:
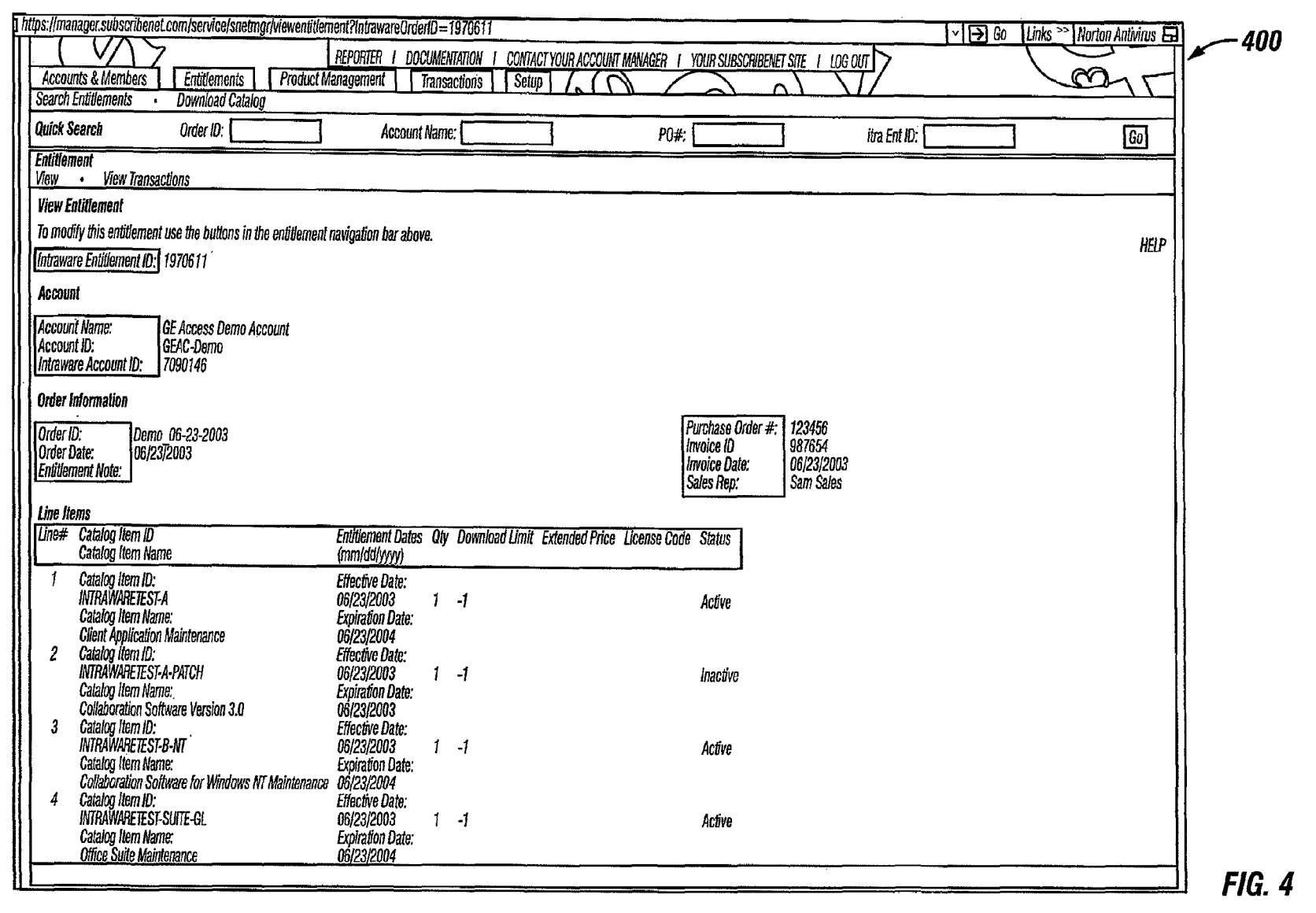

FIG. 4 shows a user interface for viewing entitlements from the system of FIG. 1;

FIGS. 5a and 5b show a user interface for creating and editing entitlements from the system of FIG. 1;

Figure 6:
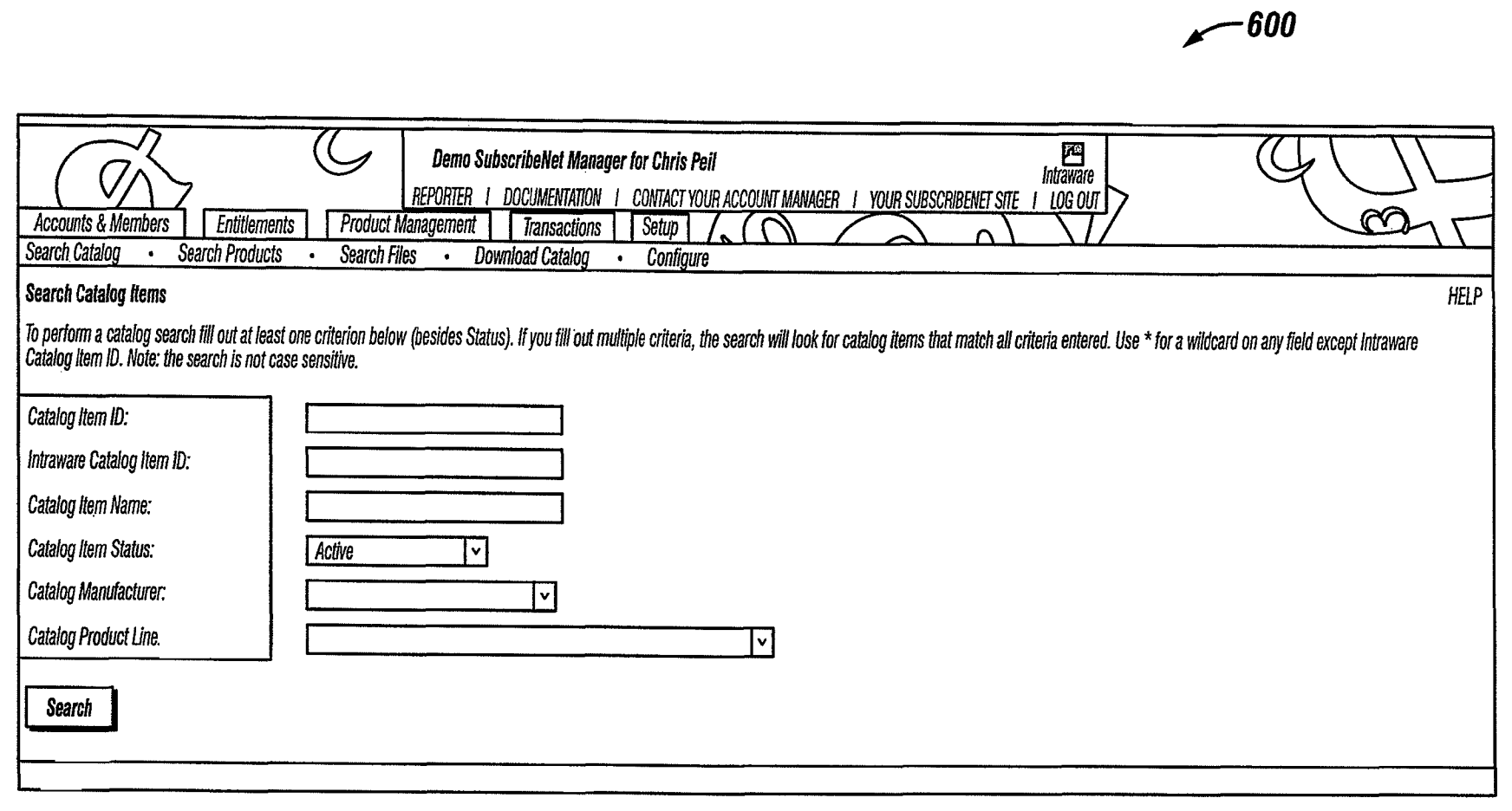

FIG. 6 shows a user interface for searching Catalog Items from the system of FIG. 1;

FIG. 7 shows a user interface for viewing Catalog Items from the system of FIG. 1;

FIG. 8 shows a user interface for creating and editing Catalog Items from the system of FIG. 1;

Figure 9:
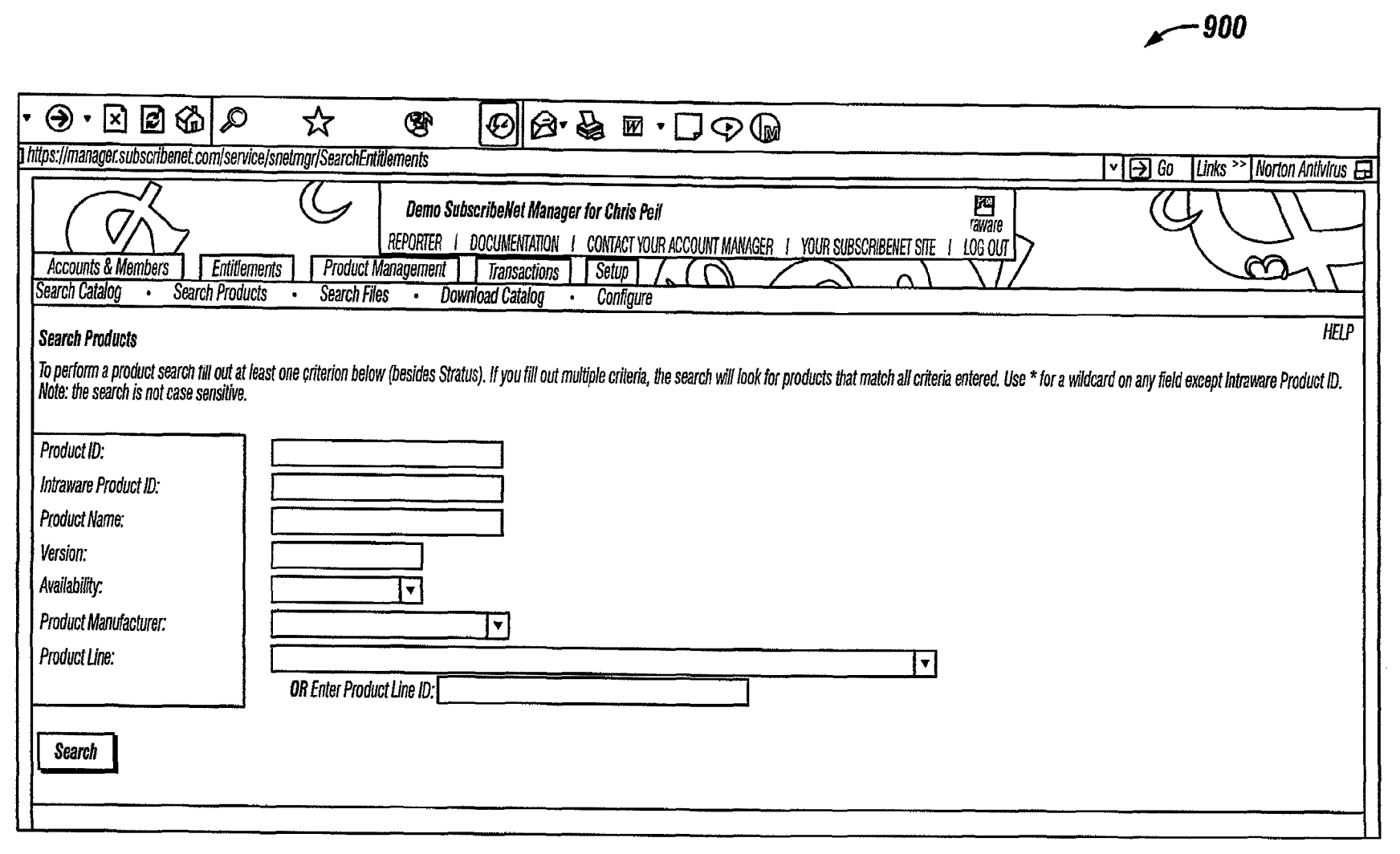

FIG. 9 shows a user interface for searching Products from the system of FIG. 1;

FIG. 10 shows a user interface for viewing Products from the system of FIG. 1;

Figure 11B:
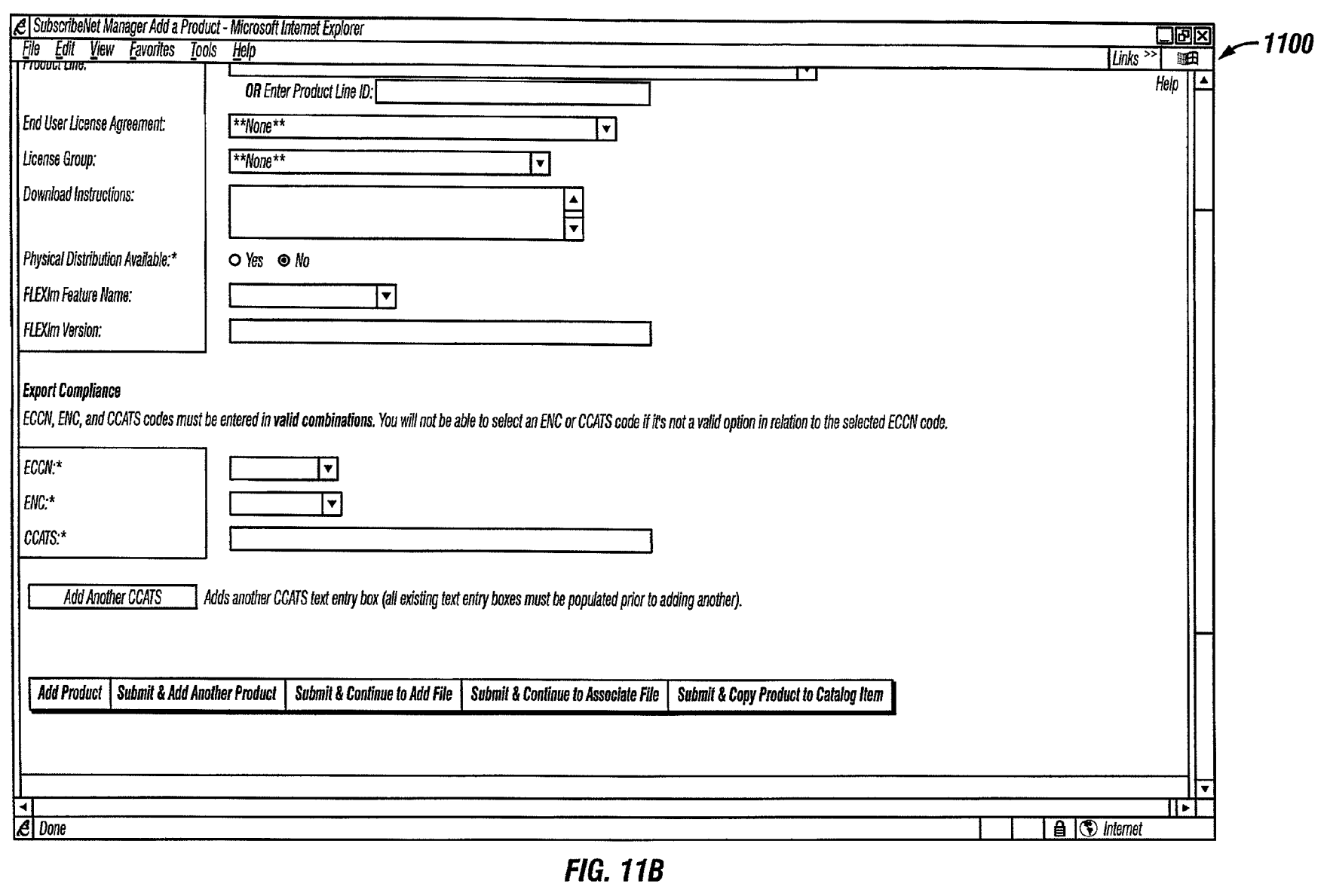

FIGS. 11a and 11b show a user interface for creating and editing Products from the system of FIG. 1;

FIG. 13 shows a user interface for viewing Files from the system of FIG. 1;

Figure 14:
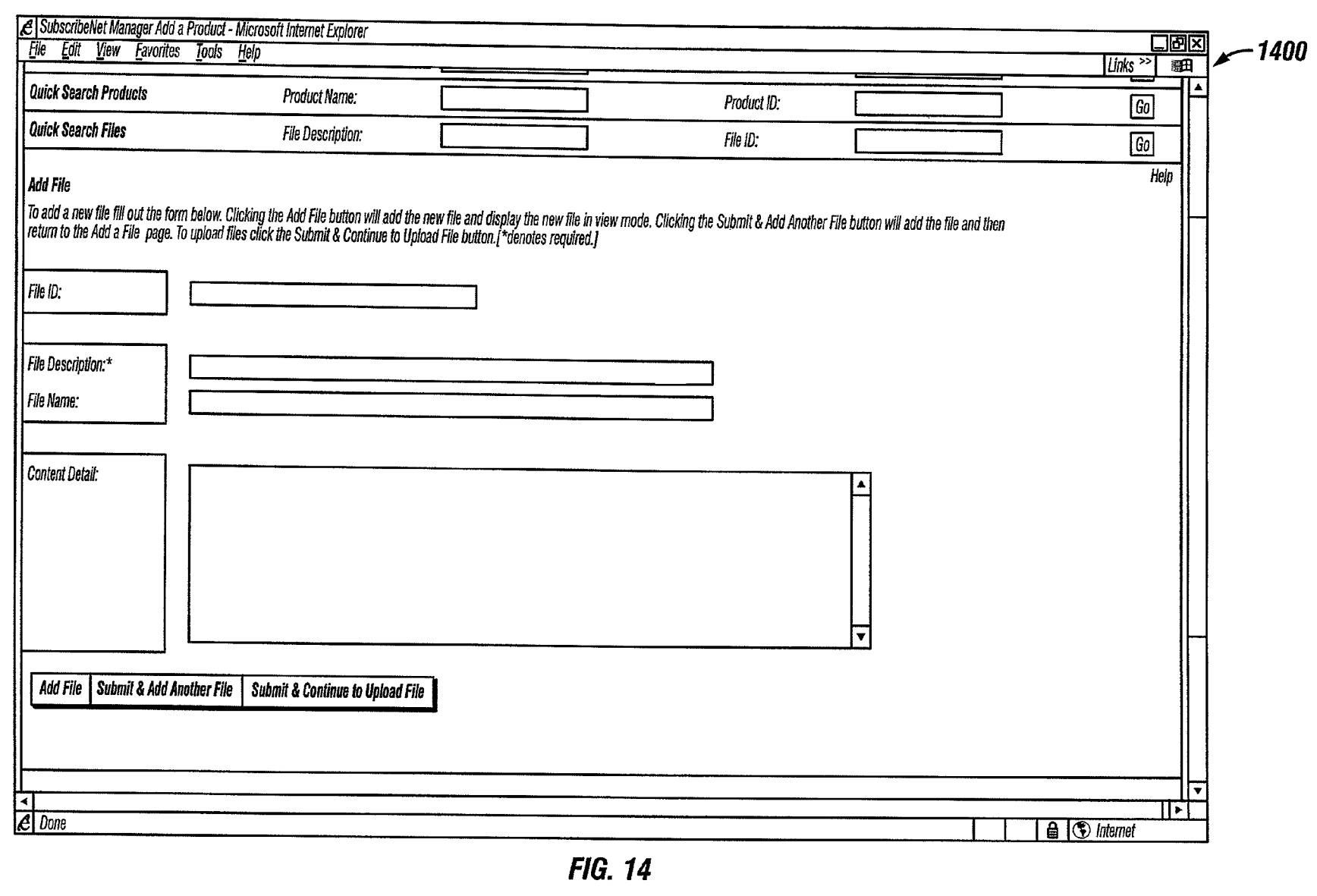

FIG. 14 shows a user interface for creating and editing Files from the system of FIG. 1;

DETAILED DESCRIPTION OF THE INVENTION

The presently preferred embodiment of the invention provides a method and apparatus that enables software publishers and other sellers of subscription services. e.g. subscriptions, such as maintenance or license programs, to track when the subscription period for each customer expires, to inform interested contacts at the customer proactively that a renewal for their subscription is coming due, and to provide a way for those contacts at the customer to purchase a renewal of their subscription program.

Features of the invention include, inter alia, the following:
- Provides a fully integrated and automated solution that enables software publishers or other sellers of subscription programs to track when the subscription period for each customer expires, to inform the customer proactively that a renewal for their subscription is coming due, and to provide alternate ways for the customer to purchase a renewal of their subscription program.
- Provides a fully automated solution that can operate without continual manual intervention by the software publisher or other seller of subscription programs.
- Provides a service solution, that enables the software publisher or other seller of subscription programs to establish within the service the business rules related to renewals processing and to define templates for communication with customers. Service business rules are only changed when the seller of subscription programs business requirements change.
- Targets renewals sales activities at a broad set of potential buyers at the customer, particularly at the end user of the subscription service.
- Leverages existing capabilities of the current services where possible.
- Provides alternatives for communication to customers with upcoming renewals that include:
    - Fully automated, proactive communication to customers using email; and
    - Fully automated notification to, a sales representative of the software publisher or other seller of subscription programs, informing them about an upcoming customer renewal.

The System

The invention preferably operates in connection with a hosted, network-based delivery and support solution that enables vendors of digital goods to easily deliver, track, and manage the digital goods and entitlements that the vendors distribute to their global customers. Advantageously, such solution is rapidly implemented and seamlessly integrated into a customized web site, and supports any e-commerce, direct, or channel sales model. The invention finds particular application in a system for electronic distribution of digital goods such as software. The following discussion describes such system in detail, as set forth in U.S. patent application Ser. No. 10/635,840, filed Aug. 5, 2003, for Method and System For Managing Digital Goods, attorney docket no. INTRO003, which application is incorporated herein in its entirety by this reference thereto.

Figure 1:
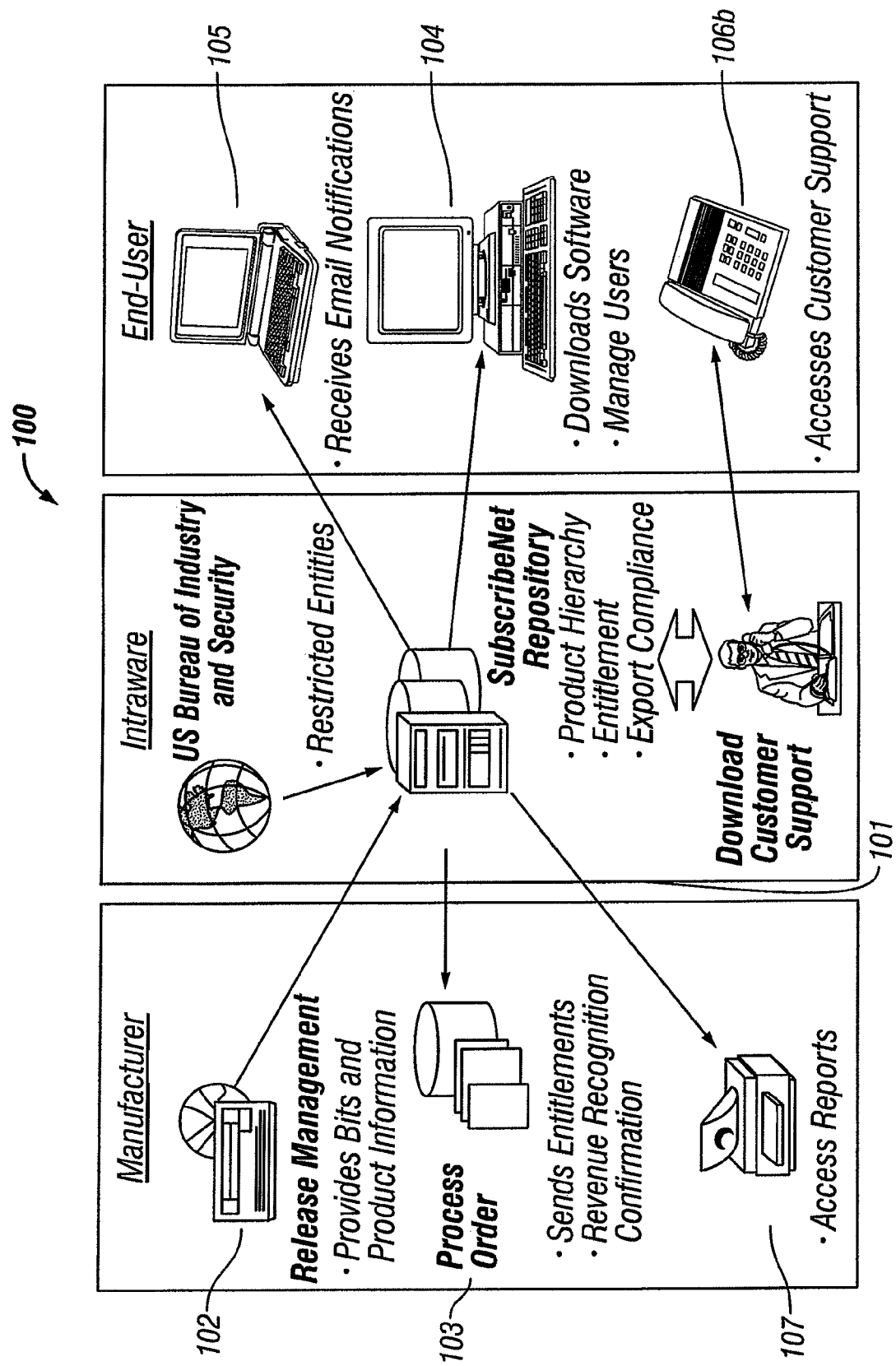
FIG. 1 provides a data flow diagram in a system for managing digital goods according to the invention.

FIG. 1 provides a diagram of a system for managing digital goods 100. The system may be implemented across a publicly accessible network, such as the Internet. Data flow within the invented system is also shown. The invented system is built around a repository 101, the repository including one or more servers and associated mass storage that store a copy of a vendor's product, documentation, release notes and any other related material. These are typically provided by the vendor 102 as part of the original implementation of the product management and distribution service provided through the system. Subsequently, the materials are refreshed as products are updated. The system also associates each downloadable file (image) with one or more vendor part numbers. Typically, the system operator makes the system available to vendors on a subscription, or fee basis; however, other business models are possible Once the images are loaded into the system, and the part numbers created, the system is ready to process orders 103 and deliver the digital goods, for example, software, to the vendor's customers 104. This 'entitlement' process typically happens with, for example, an XML-based data feed that originates with the vendor's order management or ERP (enterprise resource planning) system. The data feed specifies which customers are being entitled to which part numbers, and under what license and maintenance terms. The entitlement data feed may also contain other vendor-specific information, such as license keys and support codes. Other methods of transmitting order information to the system may be envisioned by one having an ordinary level of skill and are well within the scope of the invention.

The system processes the data feed and creates user accounts, if necessary, and the entitlements that allow the customer to see and download the appropriate images when they log into the service web site. The system also associates all the vendor and customer specific information with the vendor part numbers so that they are available at the time of delivery.

The system then generates e-mail messages 105 to designated contacts within the customer account to notify them that their software is available. The email may include a unique URL that gives the customer access to his or her own dynamically generated, and password-protected web site, thus providing the customer a personalized, digital goods management portal. The web site may be branded to the vendor, having the same look and feel as the rest of the vendor's web site. Through this personalized web site, the customer gains ready access to any digital goods the customer is entitled to, as well as any related documentation, access keys, release notes, and contact information, not only for the current order, but also for any previous releases to which that customer is entitled.

The system can also be configured so that when the customer first attempts to download a particular product, the customer is required to read and to accept online end-user license agreement (EULA). A reporting function 107 delivers regular reports to the vendor, allowing the vendor to closely monitor activities from all of the vendor's customer accounts.

Managing Entitlements

As previously described, entitlement is the process of matching customers with the product(s) that they have purchased, and granting them access to the product(s). Accordingly, an entitlement may be seen as being the equivalent of an order, but may also be used to grant direct access to software without an order. FIGS. 2 through 5 provide screenshots of user interfaces for managing entitlements By means of the user interfaces for managing entitlements, a vendor is able to view, create and/or edit entitlements. Entitlement management initially involves searching for and selecting an existing entitlement (FIG. 2), or by creating a new one (FIG. 5). Because entitlements are granted to accounts, the vendor must first select an account (FIG. 3) or create a new one (not shown).

Entitlement management includes the following options:

Search Entitlements—the user interface 200 for searching Entitlements provides the following search criteria:
  Account name;
  Account ID;
  System Account ID;
  Order ID;
  System Entitlement ID;
  Order date range;
  Purchase order no.;
  Invoice ID; and
  Catalog Item ID (described below).

View Entitlements—The 'View Entitlement' screen 400 is accessed either by searching for and selecting an existing Entitlement or by creating a new Entitlement Item. The 'View Entitlement' screen displays the current values for Entitlement attributes. This screen also shows the Catalog Items associated with this Entitlement. Clicking on a Catalog Item navigates the user to that Catalog item's 'View Catalog Item' page.

Figure 3:
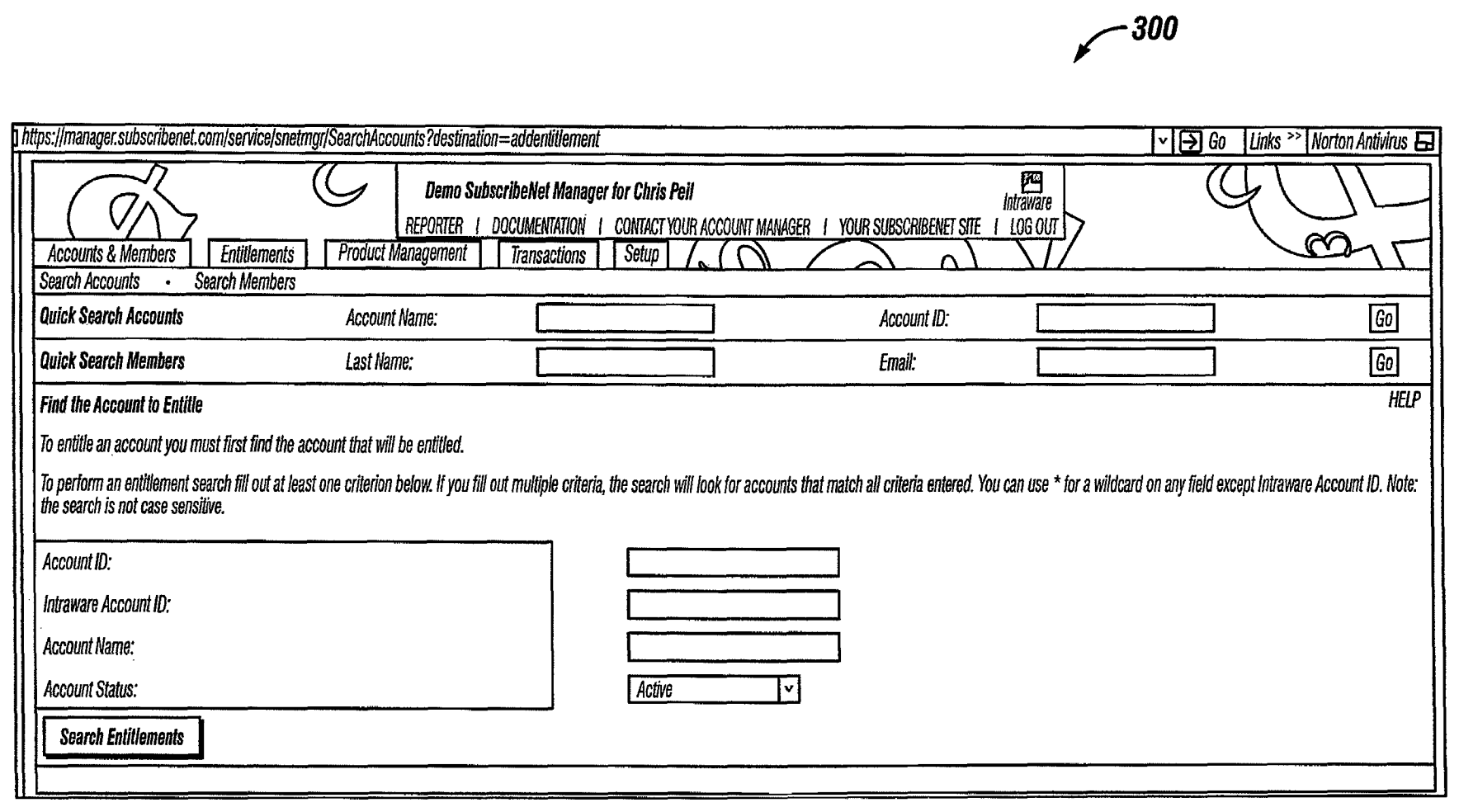
Figure 5A:
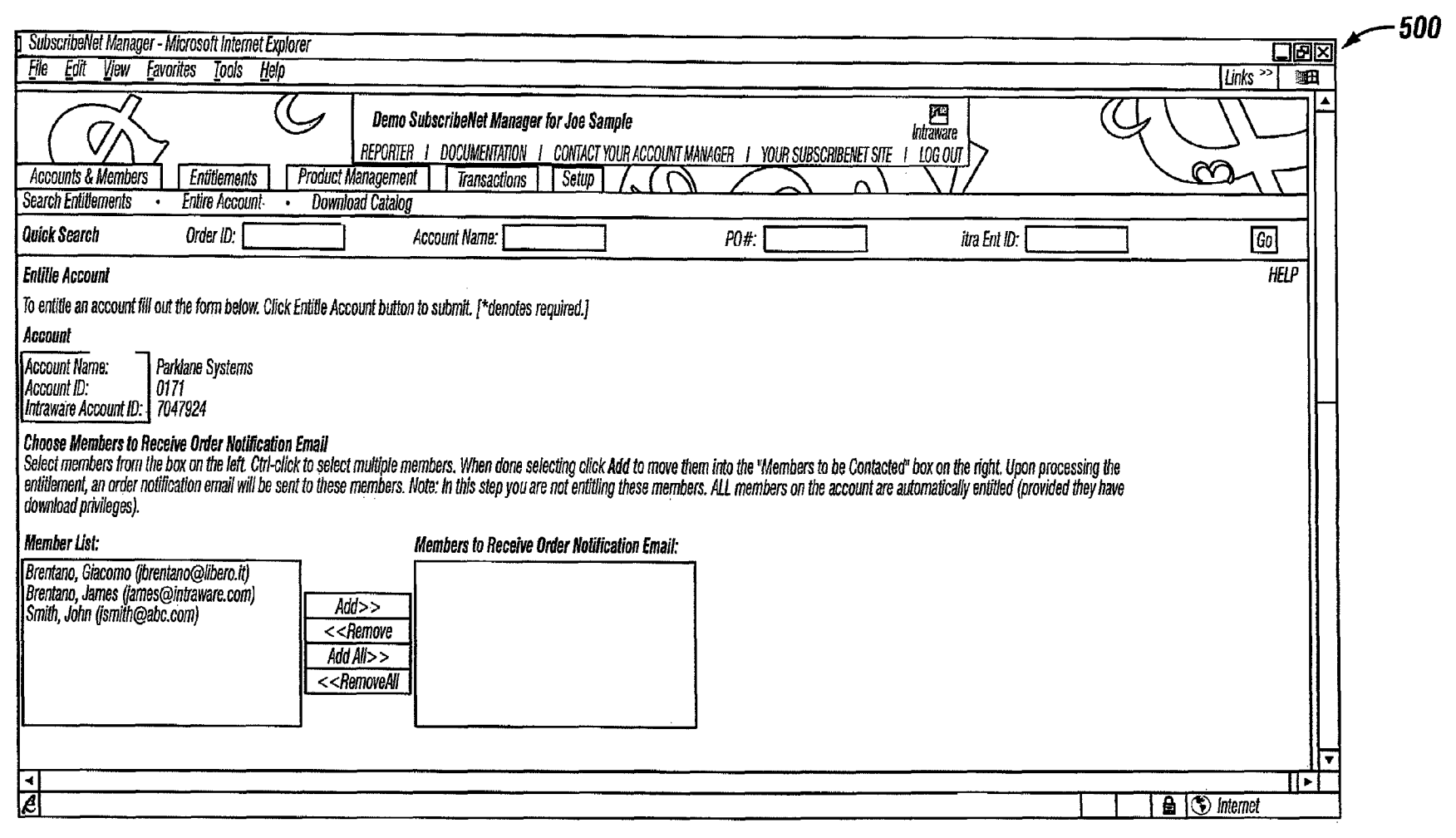
Figure 5B:
Figure 12:
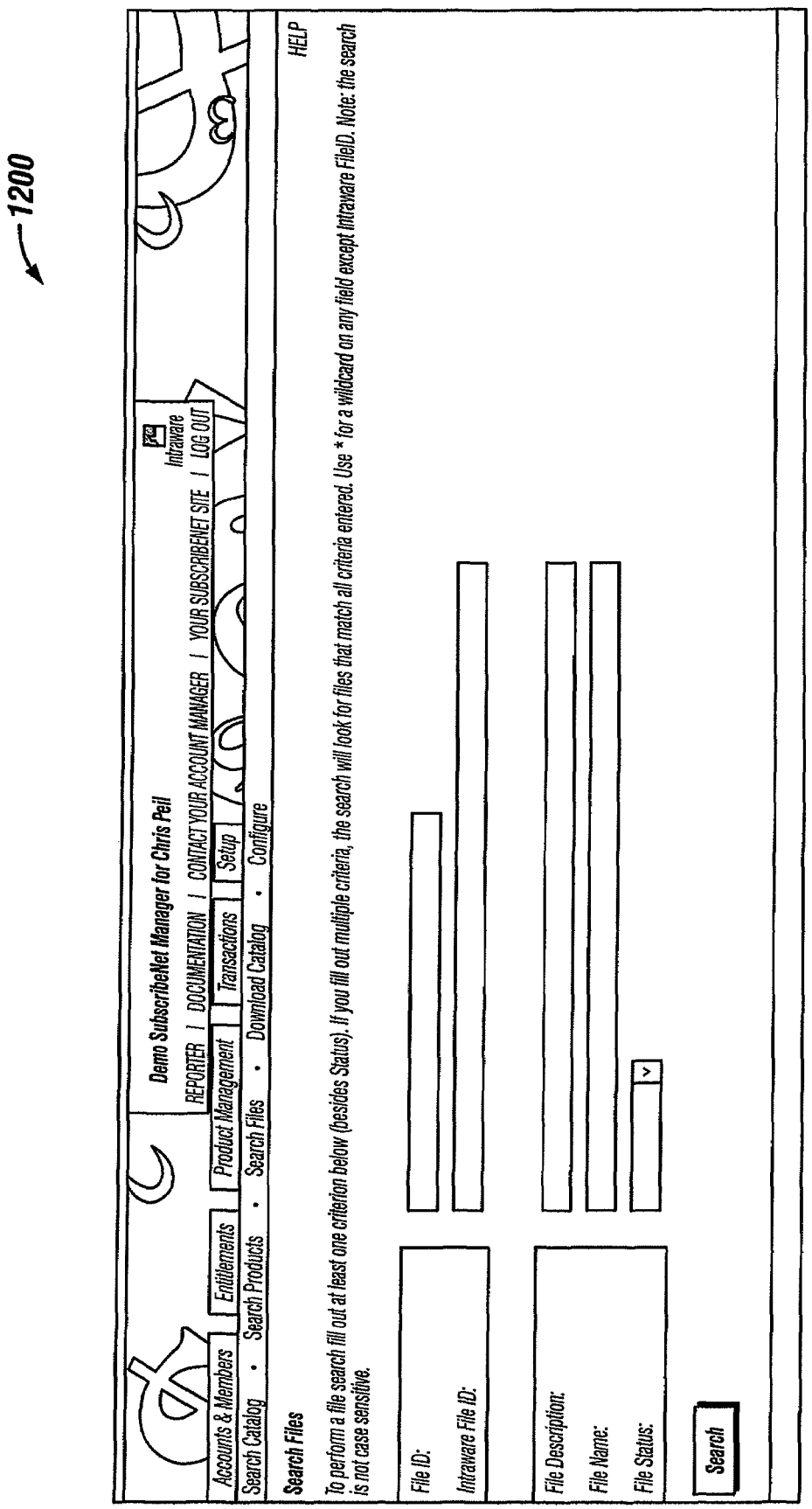
FIG. 12 shows a user interface for searching Files from the system of FIG. 1.
Figure 15:
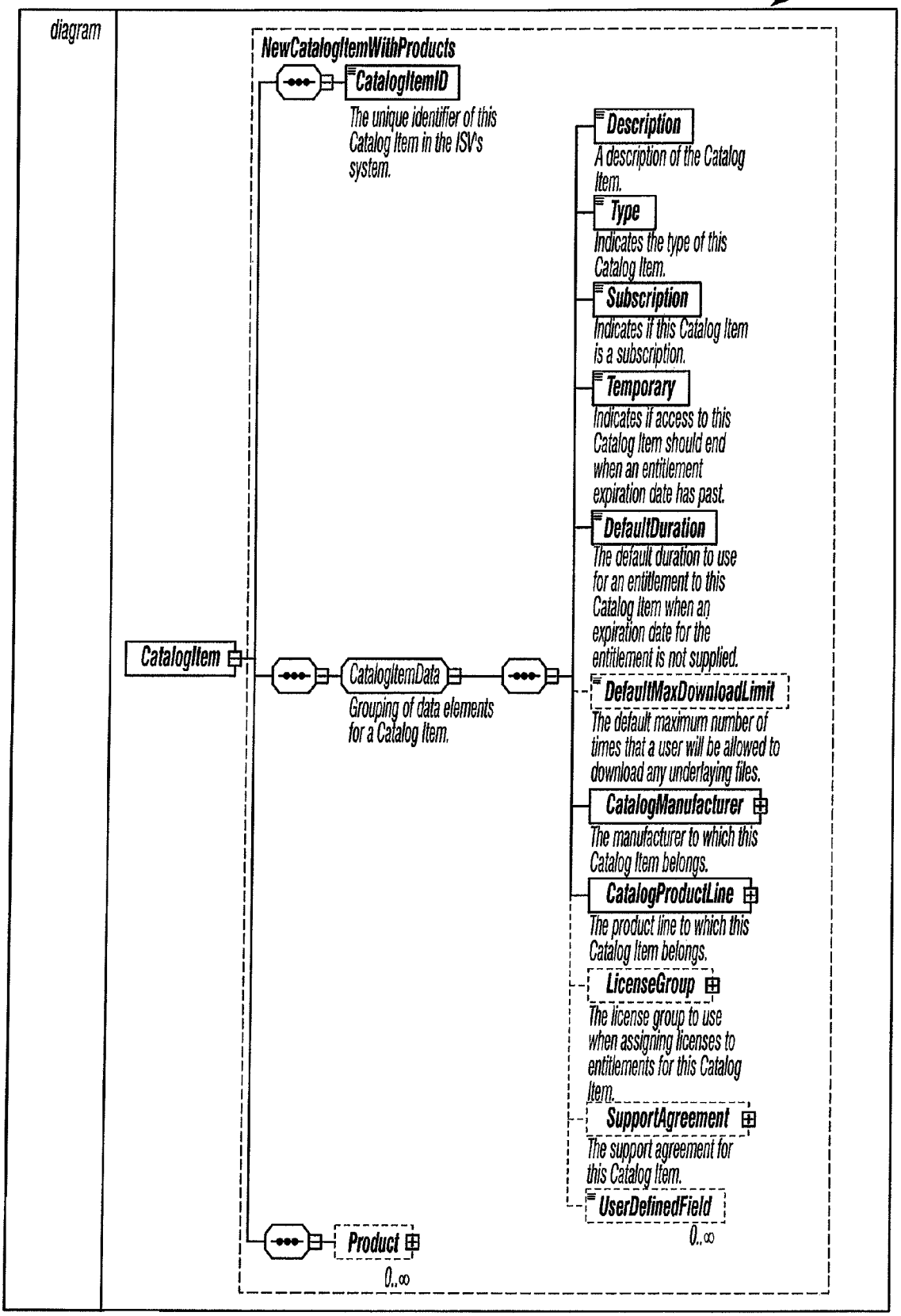
FIG. 15 provides a diagram of a Catalog Item level from a product hierarchy in the system of FIG. 1.

Entitle Account—Because entitlements are granted to accounts, the system provides a means of locating the account to be entitled, using the 'Find account' user interface 300, shown in FIG. 3. When the desired account is located, the actual entitlement is added, wherein the products the account needs to be entitled to are specified. Definition of the entitlement is accomplished using the user interface for creating and editing entitlements 500 as shown in FIGS. 5a and 5b. Vendor definable Entitlement attributes include:
  Account name;
  Account ID;
  System Account ID;
  Order ID;
  System Entitlement ID;
  Order date;
  Effective date;
  Expiration date;
  Purchase order no.;
  Invoice ID;
  Invoice date;
  Sales rep;
  Catalog Item ID (described below).
  Quantity;
  Download limit;
  Extended price;
  License group; and
  Status.

Product Management

Using the product management interface, new product information can be added, or products that are already in the system can be edited or updated, and the corresponding downloadable files added. The invention permits product information to be organized as a multi-level hierarchy. The product management interface allows the vendor to create a variety of objects, each type of object corresponding to a level in the product hierarchy. The product management interface is currently instantiated as both a web based interactive user interface and as a programmatic XML-based interface. One skilled in the art can easily envision additional representations for this functionality. In the current embodiment, products are managed using at least three different levels: Catalog Item, Product, and File. Thus, there exist the following corresponding object types:

Catalog Items (price list items) represent a vendor's discrete product offerings; for example, a product or a maintenance agreement. 'Catalog Items' generally are associated with one or more 'Products'.

Products (product releases) represent the things that the vendor wants delivered, for example, a specific version of a product. 'Products' reference one or more 'Files'.

Files (images) are the actual software files that the end user downloads, for example, the installation executable for a particular platform. A 'File' may be associated with one or more 'Products'.

The invention provides vendor definable-objects for each level of the hierarchy. Attributes for each object are defined by means of the product management interface.

Figure 16:
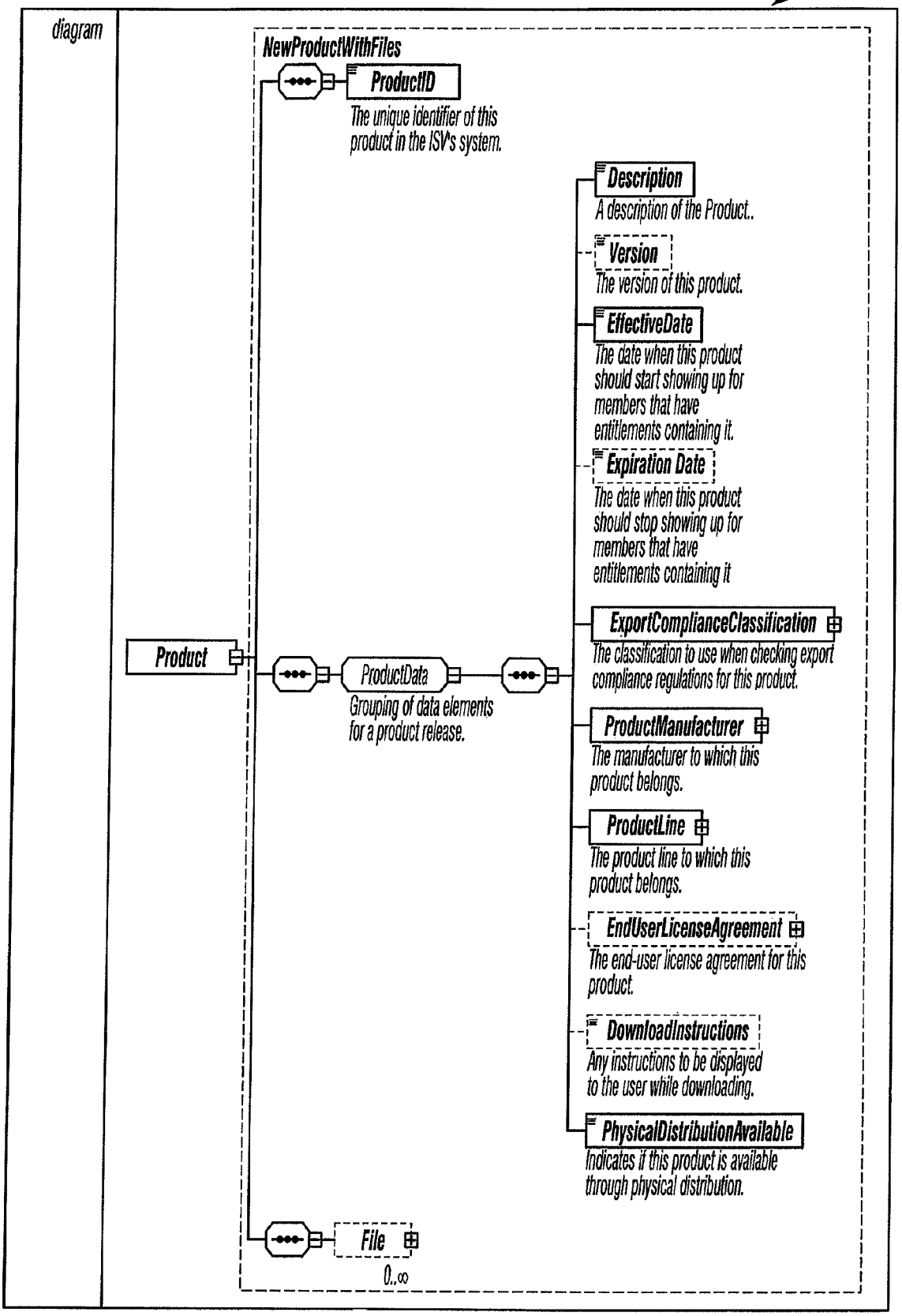
FIG. 16 provides a diagram of a Product level from a product hierarchy in the system of FIG. 1.

Catalog Item (FIG. 16)

Editing or Updating a Catalog Item

The invention includes a search Catalog Item user interface 600 that allows a vendor to locate a Catalog Item using a variety of search criteria. If the search criteria match more than one 'Catalog Item', the searcher is presented with a selectable list of Catalog Items satisfying the search criteria.

Possible search criteria include:
  Catalog Item ID;
  System ID;
  Catalog Item description;
  Catalog Manufacturer;
  Catalog product line; and
  Status, i.e. 'active' or 'inactive'.

Upon selecting a Catalog Item, the selected Catalog Item is displayed in the view Catalog Item user interface 700.

Having searched for and selected a Catalog Item, the vendor may:
  Update the item;
  Add or delete Products from the Catalog Item;
  Re-identify the Catalog Item;
  Inactivate/Reactivate the Catalog Item; and
  Copy the Catalog item to create new object.

Editing or updating a Catalog Item is by way of the user interface for creating and editing Catalog Items 800.

Creating a Catalog Item

A 'Catalog Item' may include any or all or the following vendor-definable attributes:

Catalog Item ID—the unique identifier for the particular Catalog Item in the vendor's system, for example a sale catalog or price list ID;

Catalog Item Description—a brief description of the particular Catalog Item;

Type—possible values: 'normal', 'report only', 'ignore SKU'. Can be used to inform the system not to process orders for the Catalog item. Most catalog items would be of 'normal' type, but a service agreement would not involve a deliverable product;

Subscription—Yes/No, defaults to 'Yes': indicates whether or not the particular Catalog Item is a subscription;

Temporary—Yes/No, defaults to 'No': indicates whether or not access to the particular Catalog Item should end when an entitlement expiration date has passed;

Default Duration—defines the default duration to use for an entitlement to the particular Catalog Item;

Download limit—(Yes/No), defaults to 'No'. If 'Yes' is selected, the files associated with Products that are entitled through this Catalog Item may only be downloaded a limited number of times, specified by Default Maximum Download Limit;

Default Maximum Download Limit—the default maximum number of times that a user will be allowed to download any files associated with the particular Catalog Item;

Catalog Manufacturer—List of configured companies or product groups. Manufacturer is configured via the "Configuration" menu, described below;

Catalog Product Line—the manufacturer to which the particular Catalog Item belongs;

License Group—the license group to use when assigning licenses to entitlements to the particular Catalog Item. License groups are configured at the time of site creation;

Support Agreement—the support agreement for the particular Catalog Item; and

Restricted Certificate (Yes/No)—defaults to 'No'. If set to 'Yes', then only users specifically named on an Entitlement will have access to the products entitled through the particular Catalog Item.

In addition to the vendor-supplied Catalog Item ID, each Catalog Item is assigned a unique system ID at time of creation. Creation of a new Catalog Item is by way of the user interface 800.

As shown in FIG. 16, a 'Catalog Item' is associated with one or more 'Products'. It will be apparent to one skilled in the art, that the definition of a particular 'Catalog Item' may not require the vendor to define all of the attributes listed above.

Provided herein below is a more detailed description of Catalog Item operations:

View Catalog Item

The 'View Catalog Item' screen 700 is accessed either by searching for and selecting an existing Catalog Item or by creating a new Catalog Item. The 'View Catalog Item' screen displays the current values for Catalog Item attributes. This screen also shows the Products associated with this 'Catalog Item'. Clicking on a Product Description navigates the user to that Product's 'View Product' page.

Update Catalog Item

The 'Update Catalog Item' form 800 is used to edit any of the catalog attributes except the 'Catalog Item' ID. All existing entitlements based on the Catalog Item remain in place but will reflect the new Catalog Item attributes in the reporting feature and wherever displayed on the system site. Changing the Catalog Item ID requires use of the 're-identify' feature.

Add/Delete Products to/from Catalog Item

To Add or Delete Products from a Catalog Item, it must first be identified either by searching for and selecting an existing 'Catalog Item', or by creating a new Catalog Item. The 'Add/Delete Products' feature lists any Products currently associated with the particular Catalog Item. Selecting a 'delete' checkbox next to the product and submitting the deletions deletes the selected Products from the Catalog Item.

To associate existing Product(s) to the Catalog Item, Choose 'Associate Product' from the menu. Search for the Product(s). All matching Products will be displayed. Select the one(s) to associate to the 'Catalog Item' and click the submit button. The Product(s) selected are added to the list of 'Products in this Catalog Item.'

Re-Identify Catalog Item

The Re-identify feature is used to change the Catalog Item ID. All existing entitlements based on the Catalog Item remain in place but reflect the new Catalog Item ID in the system reporter and wherever displayed on the system site.

Inactivate/Reactivate Catalog Item

Selecting 'Inactivate' or 'Reactivate' from the Catalog Menu changes the status of the particular Catalog Item. When 'Inactivate' is selected, the Catalog Item's status changes to 'Expired'. New entitlements cannot be processed for expired 'Catalog Item's but existing entitlements are not affected. Inactive 'Catalog Item's can be restored to active status by selecting "Reactivate" from the 'Catalog Item' menu.

A 'Copy Catalog Item' function is used to create a new Catalog Item that is very similar to an existing one. The 'Copy' function will take all of the attribute values of the original Catalog Item and copy them into the corresponding fields of a new 'Add Catalog Item' form. One can then make any changes necessary to distinguish the new Catalog Item from the original and then save the new Catalog Item.

Figure 17:
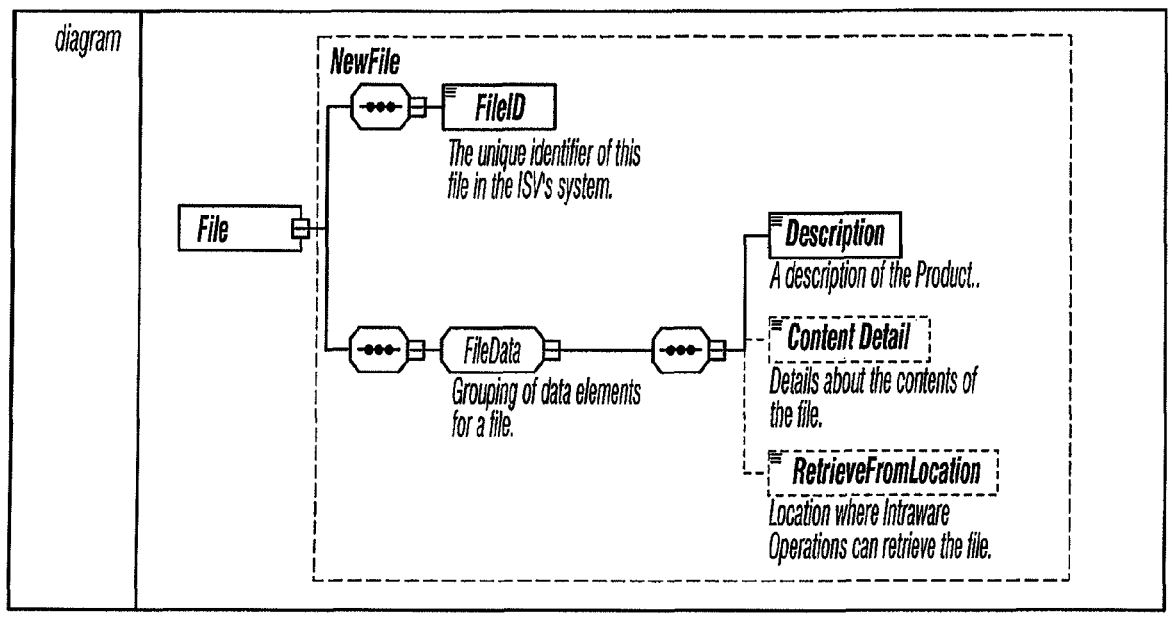
FIG. 17 provides a diagram of a File level from the product hierarchy in the system of FIG. 1.

Product (FIG. 17)

Editing or Updating a Product

Products are also searchable by way of the 'Search Products' user interface 900 in a manner similar to that previously described for Catalog Items.

Possible search criteria include:
Product ID;
System ID;
Product description;
Product Manufacturer;
Product line; and
Status.

As with Catalog Items, after a Product is selected, it is displayed by way of the view Product user interface 1000. Having searched for and selected a Product, the vendor may:
Update the item;
Add or delete Files to/from the Product;
Re-identify the Product;
Inactivate/Reactivate the Catalog Item;
Find all Catalog Items that include the particular Product;
Copy Product information as a short-cut to making a new Product having similar characteristics;
Add the particular Product to a selected Catalog Item, or Items; and
Instruct the system to use the particular Product in all Catalog Items where some other product is used, for example, instructing the system of use version 2.1.1 wherever version 2.1 is found; and
Send email notification to users who have entitlements which include this Product The vendor can also create a Catalog Item based on the Product; that is, a Catalog Item having the same ID, Description, Product Line, and so on. Selecting this option navigates the Vendor to a 'Create Catalog Item' form that has been pre-populated with the attributes from the Product. When the new Catalog Item is saved, the Product will already be associated with it.

Creating a Product

A Product constitutes a logical description of one or more downloadable files, often bundled together as a release. Such deliverable products are associated with one or more Catalog Items that have been previously configured, and through which the Product is entitled. New Products may be created, or existing ones edited by way of a user interface for creating and editing Products 1100. A Product may include any or all of the following vendor-definable attributes:

Product ID—the unique identifier for the particular Product in the vendor's system;

Description—a description of the particular Product, preferably a user-friendly name for the product. The product description is displayed and used as a landmark when navigating the vendor's web site;

Product Version—typically a numerical or textual designator;

Available Date—the date when the particular Product should start showing up for members that have entitlements containing it;

Archive Date—Once this date has passed the product/version is no longer actively displayed, but is accessible by selecting an 'Archive' tab from the end user interface;

BIS (Bureau of Industry and Standards) classification—includes ECCN (EXPORT CONTROL CLASSIFICATION NUMBER), ENC (ENCRYPTION COMMODITIES AND SOFTWARE), and CCATS (COMMODITY CLASSIFICATION AUTOMATIC TRACKING SYSTEM) codes; specifies the product's encryption levels and export licenses, allowing the product to be distributed worldwide;

Product manufacturer—A list of configured companies or product groups, Manufacturer is configured via the "Configuration" menu Product line—Product Line is configured via the "Configuration" menu;

End user license agreement (EULA)—A list of configured click-through agreements that may be associated with a Catalog Item. EULA's are configured through the 'Configuration' menu.

Product Note—Supplemental information for the end user, the Product Note is displayed on the Product Download page of the vendor's web site.

Physical distribution available—indicates whether or not the particular Product is available through physical distribution in addition to electronic delivery; and Send Update Notification (Y/N)—configurable from a separate screen.

In addition to the vendor-supplied Product ID, each Product is assigned a unique system ID at time of creation.

As shown in FIG. 16, a Product is associated with one or more Files. It will be apparent to one skilled in the art that the definition of a particular Product may not require the vendor to define all of the attributes listed above.

Provided herein below is a more detailed description of Product operations:

View Product

The 'View Product' screen is accessed either by searching for and selecting an existing Product 900 or by creating a new Product 1100. The 'View Product' screen 1000 displays the current values for the particular Product's attributes. This screen also shows the Files associated with the particular Product. Clicking on a File Description navigates the user to that File's 'View File' page.

Update Product

Once a Product has been selected, the vendor can click on 'Update' to edit and update the Product attributes. The Update Product form behaves much like the Create Product form and allows the vendor to modify all of the product information except the 'Product ID'. If the vendor needs to change the 'Product ID', they must use the 'Re-identify Product' feature.

Add/Delete File

To add or delete Files from a Product, the vendor must first identify the Product either by searching for and selecting an existing Product, or by creating a new Product. The Add/Delete Files form lists any Files currently associated with this Product. To delete one or more of these Files, the vendor must click on a 'delete' checkbox next to the item(s) and then click on 'Submit'. To associate an existing File to a Product, the vendor must search for and select the Product to which it s desired to associate Files. The vendor then chooses an 'Associate File' feature and searches for the File(s). All matching Files will be displayed. The vendor then selects the one(s) to be associated with the Product and clicks the 'Submit' feature. The File(s) selected will be added to the list of 'Files in this Product'. The vendor may also add a specific file to one or more Products by using an "Add To" menu item from the View File screen 1300.

Re-Identify Product

If for some reason the vendor needs to change the Product ID of a Product that already exists in the system 100, one can do so by selecting 'Re-identify' once one has selected a Product. The 'Re-identify' form prompts the user for a new Product ID.

Inactivate/Reactivate Product

The most common reason to inactivate a Product is that a vendor's company is retiring the product or product line. Inactivating the Product does not affect accounts that already have entitlements to the Product, although it does prevent new orders for Catalog Items that include the Product from granting new entitlements to the product. Inactive Products can be reactivated by clicking on 'Reactivate' once the user has selected the Product.

Where Used

A 'Where Used' function lets the vendor find all of the Catalog Items that include the particular Product. Clicking on 'Where Used' returns a list of the Catalog Items that use the particular Product. Clicking on the name of a Catalog Item within this list will take you to the View Catalog Item screen from which you can also manage the Catalog Item.

Copy

To create a new Product that is very similar to an existing one, the vendor can use the 'Copy' function on the Product menu. The 'Copy' function will take all of the attribute values of the original Product and copy them into the corresponding fields of a new 'Create Product' form. One can then make any changes necessary to distinguish the new Product from the original and then save the new Product.

Add to

An 'Add To' function allows the vendor to associate the particular Product with one or more Catalog Items. After clicking 'Add To', the vendor is presented with a Catalog Item Search screen 600. A wild-card search capability allows the vendor to search for and select Catalog Item(s) to add this Product to.

Use where

In some cases the vendor may not want to explicitly select Catalog Items to associate the particular Product with. An alternative is to tell the system to use the Product wherever some other Product is already being used. That is, to associate the Product with all the Catalog Items with which another Product is associated. When the vendor clicks on 'Use Where', a 'Product Search' screen 900 is presented. The wild-card search capability allows the user to search for and select the Product(s) that will serve as the template for associating the particular Product with Catalog Items. Note that the 'Use Where' function will update all Catalog Items that contain the template Product unless the Catalog Item is a "non-Subscription" item. In order to associate a Product with a non-Subscription item the user must use the 'Add To' function.

Send Notification

A 'Send Notification' function allows the user to provide email text that will be sent to all users who have an entitlement that includes the particular Product. The vendor provides the subject line and the text of the email message.

File (FIG. 17)

Editing or Updating a File

'Files' are also searchable, as previously described for 'Catalog Items' and 'Products' by way of the search Files user interface 1200.

Possible search criteria include:

File ID;

System File ID

Short Description—The "name" of the file that the user sees.

File Status (Active, Inactive, or Both); and

File Name—Actual system level name of the file; for example, "installer_2_7.zip".

Having searched for and selected a File the selected File is displayed in the view Files user interface 1300. After selecting a File, the vendor may:

Update the File information;

Upload a file (that is, upload the actual bits associated with the particular File object);

Find all the Products where this File is used (Where Used);

Add the file to one or more Products;

Inactivate/Reactivate the File; and

Instruct the system to use this File in all Products where some other File is used; for example, "use Widget_2_I.ReadMe.txt wherever Widget_2_I.exe is found".

Creating a File

Files are what the end user actually downloads. Files that are part of the same release are grouped together into one or more Products, that are in turn entitled through Catalog Items. Files are created by way of a user interface for editing or creating Files 1400. A 'File' may include any or all of the following vendor-definable attributes:

File ID—A unique value by which the vendor identifies the particular file, for example an identifier from a release management or source code control system;

Short Description—The file name that the end user sees, ideally a brief but descriptive name, for example, "Enterprise Server 2.4 Solaris";

Long description—Additional installation information or compatibility hints or to provide detailed information about the file content Note that if the file provided is in a zip format then the user interface will automatically display the zip file contents in addition to the information provided by the vendor;

File Sort Order—If numeric values are provided, then the files that are part of the particular Product will be sorted in ascending numeric order. If no sort order is specified or when more than one file has the same 'File Sort Order' number, the files will be sorted in alphabetical according to the 'Short Description';

Deliver File via (Upload/Other)-'Upload' allows the vendor to use a system 'Upload Product Files' feature to upload the file from a browser; and Retrieve From—The vendor specifies the location of the image file. The most common methods of supplying the file are by uploading to the system server, providing a link to an ftp server, or sending CD's or some other removable medium. When a file is uploaded, this field is filled in automatically. If the file is to be provided from an FTP server, the vendor must provide a fully qualified path to the file. If the file is provided on removable media, information needed to load the file and correctly associate it with the product needs to be provided.

In addition to the vendor-supplied File ID, each File is assigned a unique system ID at time of creation.

Provided herein below is a more detailed description of File operations:

View File

The 'View File' screen 1300 is accessed either by searching for and selecting an existing File 1200 or by creating a new File 1400. The View File screen displays the current values for the particular File's attributes.

Update File Information

Once the vendor has selected a File, they can click on 'Update' to edit and update the File attributes The 'Update File' form behaves much like the 'Create File' form and allows the vendor to modify all of the product information except the 'File ID'. If the actual base file has been uploaded and is in the system then the vendor may also update the File Name.

Upload File

One can upload the actual system file to an existing File object by selecting 'Upload File' from the menu. An 'Upload File' form displays the details of the File object the file is being uploaded to. The vendor can either enter a file path (relative to the vendor's computer) or click a 'Browse' button to open a system window which will allow the vendor to choose the file using the OS file manager. Clicking on 'Submit' uploads the file to the system.

Where Used

The 'Where Used' function allows the vendor to find all of the Products that include the particular File. Selecting 'Where Used' returns a list of the Products that use the File. Clicking on the name of a Product within this list will navigate the user to the 'View Product' screen 1000.

Add to

The 'Add To' function allows one to associate this File with one or more Products. After selecting 'Add To', a Product Search screen appears 900. The wild-card search capability allows the vendor to search for and select the Product(s) to add the File to.

Use Where

In some cases, the vendor may not want to explicitly select the Products to which they want the File associated. As an alternative one can tell the system to use this File wherever some other File is already being used. That is, associate this File with all the Products with which another after clicking 'Use Where', a 'File Search' screen appears. The wild-card search capability allows the vendor to search for and select the File(s) that will serve as the template for associating this File with Products. Note that the 'Use Where' function updates all Products that contain the template File unless the Product is a non-Subscription item. Associating a File with a non-Subscription item requires use of the 'Add To' function.

The product hierarchy may also include the following entities:

one or more product families;

one or more bundles; and one or more product lines.

These additional product groupings are defined by way of a 'Configuration' user interface (not shown).

The foregoing listing of levels, objects and object attributes is meant only to be illustrative. Other hierarchies, levels, objects and object attributes may be envisioned by one having an ordinary level of skill in the art, and are entirely consistent with the spirit and scope of the invention.

Subscription and Non-Subscription Items

Figure 18:
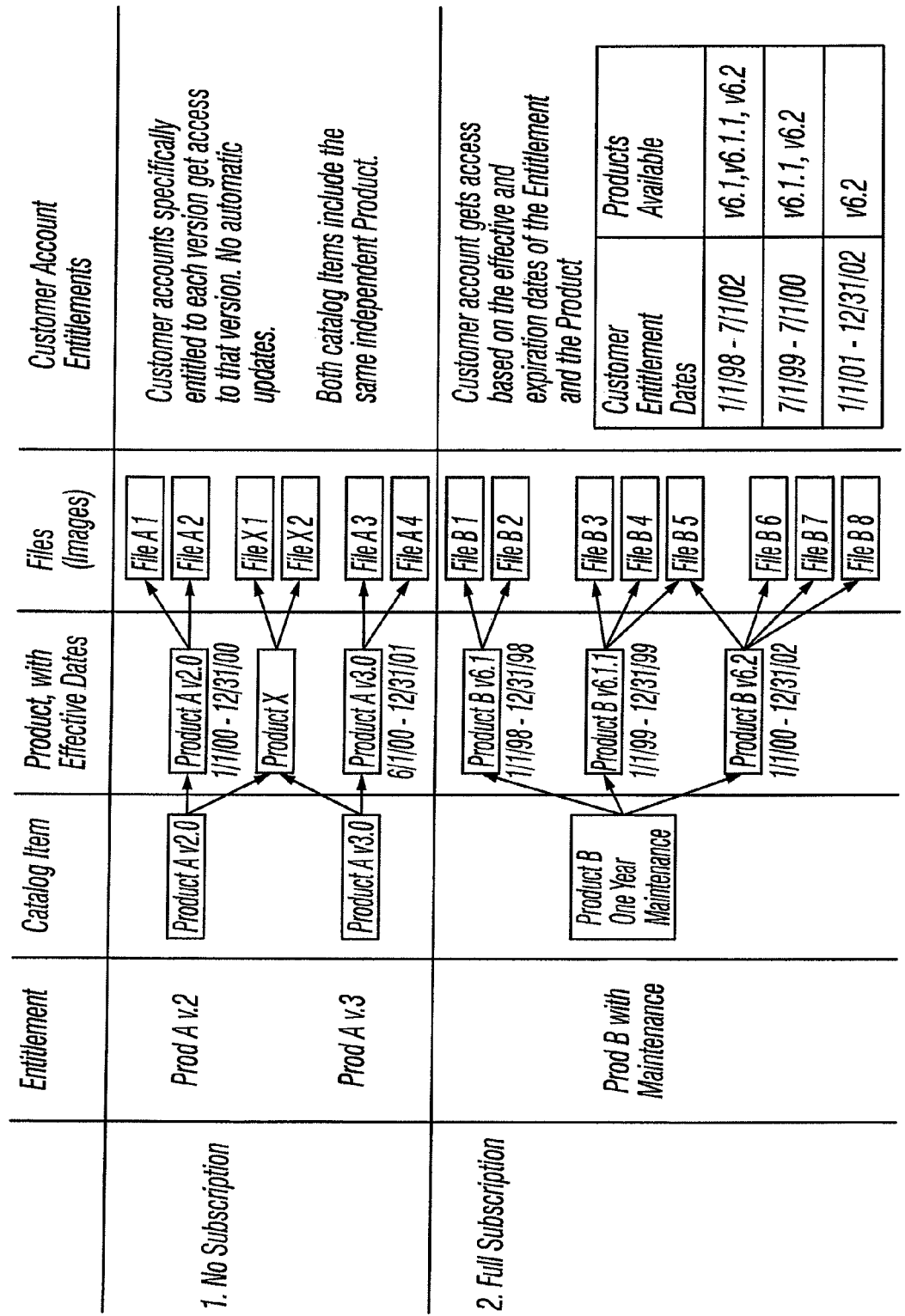
FIG. 18 provides a diagram of a product hierarchy for managing subscription and non-subscription catalog items.

FIG. 18 shows a data flow diagram for 1) non-subscription and 2) subscription items.

Non-Subscription items—as shown, customer accounts specifically entitled to separate versions of a vendor's product, denoted by separate Catalog Items, are granted access only to that version; and Subscription items—the customer account is granted access based on the effective and expiration dates of the Entitlement and the Product.

Date Management

As previously described, an end user receives access to a vendor's product either: 1) through a new entitlement to a 'Catalog Item' that has one or more products associated with it, or 2) through a new 'Product' update to a subscription-based 'Catalog Item' to which the user was previously entitled.

Figure 19:
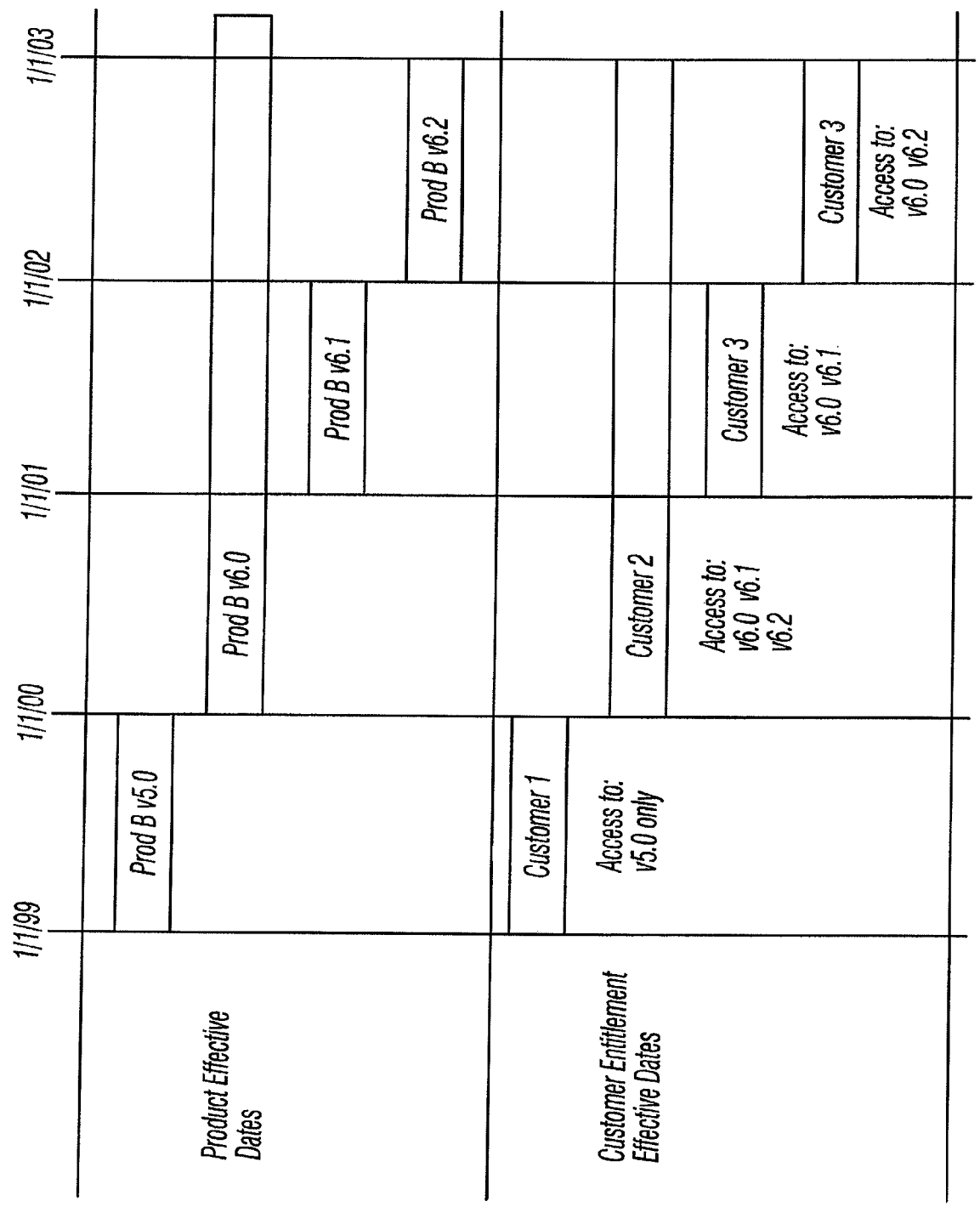
FIG. 19 provides a flow chart for date management of products.

For subscription Catalog Items, the product selection the end user sees on the service site is determined by the effective dates defined for the Products and the effective period specified on the entitlement to the corresponding Catalog Item. The overlap window between the effective and expiration dates of the Product and of the Entitlement determine which products the end user is granted access to, as shown in FIG. 19.

The invention is implemented and practiced using conventional techniques known to those skilled in the art of computer programming. A number of common programming, scripting, and/or markup languages are suitable for implementation and practice of the invention.

Capturing Maintenance Renewals

The invention comprises an automated entitlement management method and apparatus for capturing maintenance renewals revenues and, in one embodiment, is implemented as follows:

An entitlement management module, such as the SubscribeNet entitlement management module made by Intraware of Orinda, Calif. (see FIGS. 1-19 and the corresponding discussion herein), is used to track customer and subscription information, including effective and expiration dates. Data are transferred from the source location at the software publisher or other seller of subscription programs to the entitlement management module through existing APIs, web services, or a user interface (see FIG. 20 and the related discussion below). The critical data captured and tracked include, for example: customer identification data, including customer name, unique customer ID, customer contact person, email address for customer contact person; a unique identifier for the subscription program that the customer has purchased; and the customer's effective and expiration dates of the subscription program In addition to the contact information retained for the original purchaser of the subscription program, other contacts that have been added since the original purchase are also captured. Additional contacts are typically the end users of the subscription program, and are added either by the software publisher or by an administrative user from the customer. All contacts associated with a single purchasing customer are preferably associated with a single customer record or account. These multiple contacts, particularly those that are the end users of the subscription program, represent the ideal target prospect for the subscription renewal sale.

An email communication module is used to communicate to customer contacts. The email communication module enables the software publisher or seller of subscription programs to create an email template that forms the basis of the email message that is sent to the customer contact. Those skilled in the art will appreciate that other forms of communication, such as IM, SMS, and the like, may be used for such contact instead of, or in addition to, email.

A renewals management module is provided that enables the software publisher or other seller of subscription services to establish the automated business rules that define how, when, how often, and to whom communications are sent to customers who have subscription renewals coming due. The business rules include, for example, the following:

How soon prior to, or after, the subscription renewal is due that a renewal communication should be sent.

How many renewal communication messages are sent, and which contacts associated to the customer record (account) should receive these renewals communications.

Whether the renewal communication message is sent directly to the customer contacts, or whether it is sent as a notification message to a sales representative at the software publisher of other seller of subscription services.

Which email template should be used for the renewal communication notification.

The renewal communication email message that is sent to the customer contact describes which subscription is due for renewal and the price for the subscription renewal term.

In addition, the renewals management module is used to deliver renewals information to the CRM system at the software publisher or other seller of subscription programs. This delivery is completed in an automated way through the use of APIs or web service calls. The information delivered to the CRM system can be used by the sales representatives at the software publisher or other seller of subscription programs to pursue renewals opportunities actively. The information provided includes such renewals data as customer, contacts, subscription program details and expiration dates; and also includes valuable customer usage information, such as the customer's product download history, license generation activity, or access to subscription services.

The renewal communication messages include a URL link that directs the customer contact to a sales representative from the software publisher or other seller of subscription services, or to an online commerce store where the customer can provide payment information to complete an online sale and renewal of the subscription. An e-commerce module is used to perform the commerce transaction.

Online renewals sales information captured from the customer contact in a commerce module is automatically supplied to the entitlement module using the existing integration method, and the new subscription data are applied to the customer record. The updated customer subscription data are used for future renewals communication messaging when the subscription expiration is reached.

Figure 20:
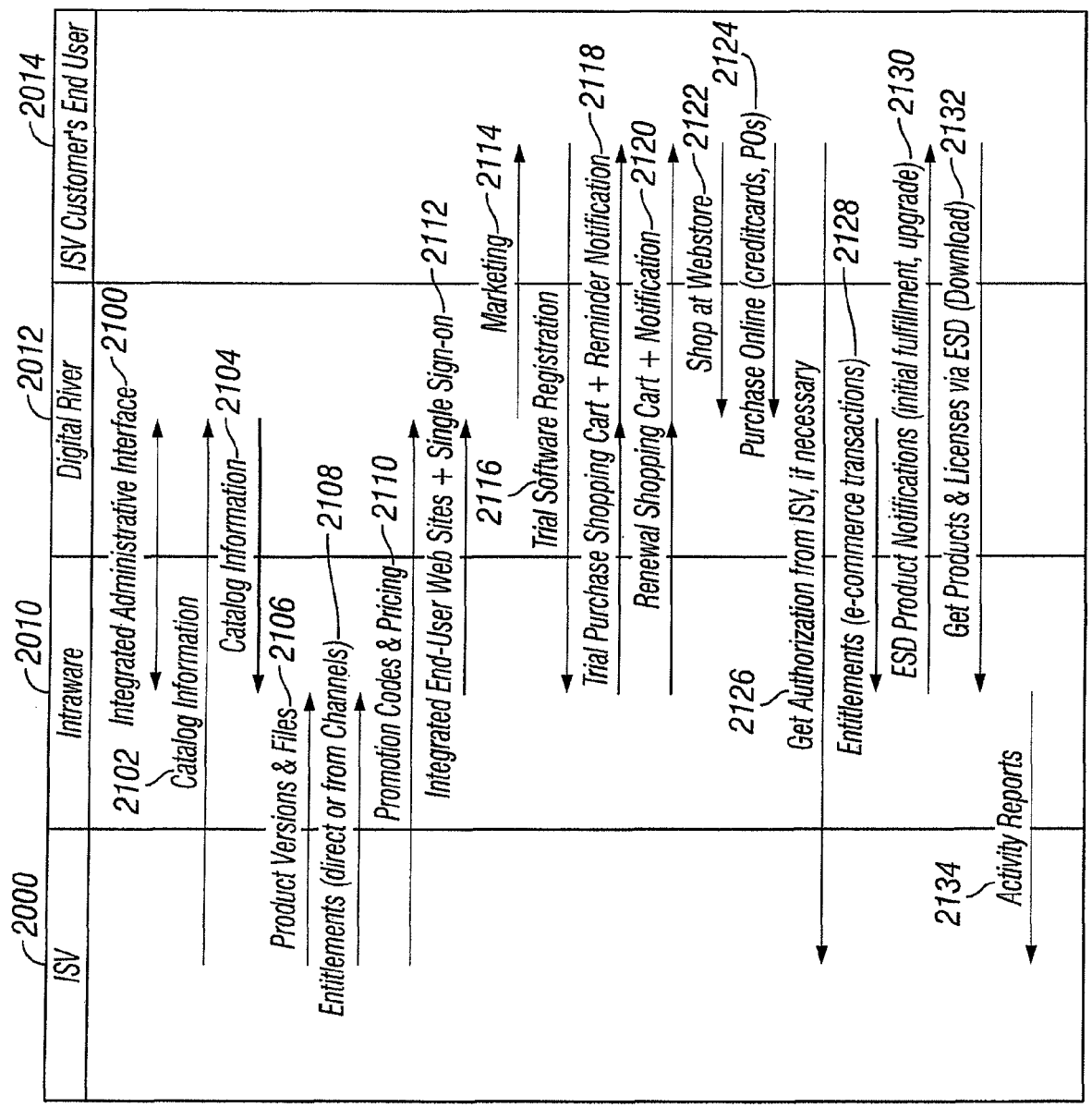
FIG. 20 provides a flow diagram showing an automated entitlement management method and apparatus for capturing maintenance renewals revenues according to the invention.

FIG. 20 provides a flow diagram showing an automated entitlement management method and apparatus for capturing maintenance renewals revenues according to the invention. In FIG. 20, software manufacturer (ISV) 2000, automated entitlement management system (Intraware) 2010, e-commerce vendor (Digital River) 2012, and customer (ISV Customer's End User) 2014 are shown in columns from left to right, respectively. Interaction between these entities is shown by lines between various of the entities, the lines having arrows showing the direction of the interaction. Process flow over time is shown with the first interactions appearing at the top of the page and progressing toward the bottom of the page, the most recent interactions in time order appearing near the bottom of the page. The process flow proceeds in accordance with the discussion above, especially with regard to the discussion concerning FIGS. 1-19, with the exception that a primary focus of the invention set forth herein concerns capturing maintenance renewal revenues, as described above.

In the process herein, as shown in FIG. 20, an integrated administrative interface (2100) is established between the automated entitlement management system and the e-commerce vendor. Software manufacturer catalog information is provided to the e-commerce vendor (2102), and is routed back to the automated entitlement management system (2104). In this way, the automated entitlement management system tracks the products listed in the e-commerce catalog. Information regarding product versions and downloadable files are transferred from the software manufacturer to the automated entitlement management system (2106). Entitlements, either direct or from any of various channels (see above) are provided to the automated entitlement management system (2108) by the software manufacturer, and promotion codes and pricing information are provided to the e-commerce vendor by the software manufacturer (2110). The automated entitlement management system and e-commerce vendor coordinate to provide integrated end-user web sites and a single sign-on function (2112). Marketing is accomplished through interaction of the e-commerce vendor and the end user (2114). This activity may result in, for example, a trial software registration, where the end user register through the e-commerce vendor with the automated entitlement management system (2116).

At this point in the process, the invention invokes the herein described method and apparatus for capturing maintenance renewal revenue. In particular, the automated entitlement management system generates a trial purchase shopping cart and reminder notification in accordance with the rules established for renewals, as described above (2118). For products that have already been purchased, the automated entitlement management system generates a renewal shopping cart and renewal notification in accordance with the rules established for renewals, as described above (2120).

The end user may shop at the e-commerce site web store (2122) and make on-line purchases (2124). These purchases may include renewals, subscriptions, and the like. If necessary, the end user gets authorization for the transaction from the software manufacturer (2126). The e-commerce vendor requests entitlements from the automated entitlement management system in connection with the end user purchase (2128), and the automated entitlement management system effects initial fulfillment of the end user's order (2130). The end user may then download the purchased products and licenses from the automated entitlement management system (2132), which then generates appropriate activity reports for the software manufacturer (2134).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for capturing maintenance renewal revenues in connection with digital goods, comprising steps of:
    providing a system configured for creating a product hierarchy for modeling and managing complex product relationships among a vendor's product and/or service offerings;
    said system configured for creating customer account entitlements to said product and/or service offerings with an entitlement management module;
    said system configured for distributing said product and/or service offerings to a customer according to said entitlements;
    said system configured for transferring data from a source location at a software publisher or other seller of subscription programs to said entitlement management module;
    said system configured for capturing and tracking customer and subscription data, wherein data captured and tracked comprises any of customer identification data, including any of customer name, unique customer ID, customer contact person, email address for customer contact person; a unique identifier for a subscription program that said customer has purchased; and effective and expiration dates of said subscription program that said customer has purchased, including any of effective and expiration dates;
    said system configured for providing a renewals management module for enabling said software publisher or other seller of subscription services to establish automated business rules that define how, when, and to whom communications are sent to customers that have subscription renewals coming due; and
    said system configured for providing a communication module for communicating with said customer contact.

2. The method of claim 1, further comprising the step of:
    said software publisher or seller of subscription programs creating a template that forms the basis of said communications that are sent to said customer contact.

3. The method of claim 1, further comprising the step of:
    in addition to contact information retained for an original purchaser of said subscription program, capturing other contacts that have been added since the original purchase of said subscription program.

4. The method of claim 3, wherein said additional contacts comprise end users of said subscription program who are added either by the software publisher or by an administrative user from the customer.

5. The method of claim 3, wherein all contacts associated with a single purchasing customer are associated with a single customer record or account.

6. The method of claim 1, said business rules comprising any of:
    how soon prior to, or after, a subscription renewal is due that a renewal communication should be sent;
    how many renewal communication messages are sent, and which contacts associated to a customer record (account) should receive these renewals communications;
    whether said renewal communication message is sent directly to the customer contacts, or whether it is sent as a notification message to a sales representative at the software publisher of other seller of subscription services; and
    which template should be used for the renewal communication notification.

7. The method of claim 1, wherein said renewal communication message that is sent to the customer contact describes which subscription is due for renewal and a price for the subscription renewal term.

8. The method of claim 1, further comprising the step of:
    using said renewals management module to deliver renewals information to a customer relations management system at the software publisher or other seller of subscription programs.

9. The method of claim 8, further comprising the step of:
    completing said delivery in an automated way through any of use of APIs or web service calls.

10. The method of claim 8, wherein said renewals information delivered to said customer relations management system comprises any of customer, contacts, subscription program details and expiration dates, and customer usage information comprising any of customer's product download history, license generation activity, and access to subscription services.

11. The method of claim 1, further comprising the step of:
    providing a link with said renewals communications that directs the customer contact to a sales representative from the software publisher or other seller of subscription services, or to an online commerce store where the customer can provide payment information to complete an online sale and renewal of the subscription.

12. The method of claim 1, further comprising the steps of:
automatically supplying online renewals sales information captured from the customer contact in a commerce module to said entitlement module;
applying new subscription data to a customer record; and
using updated customer subscription data for future renewals communication messaging when a subscription expiration is reached.

13. An apparatus for capturing maintenance renewal revenues in connection with digital goods, comprising:
a repository comprising at least one server and associated mass storage;
said repository configured to provide a product hierarchy for modeling and managing complex product relationships among a vendor's product and/or service offerings;
said repository configured to provide an entitlement management module for creating customer account entitlements to said product and/or service offerings;
said repository configured to distribute said product and/or service offerings to a customer according to said entitlements;
said repository configured to transfer data from a source location at a software publisher or other seller of subscription programs to said entitlement management module;
said repository configured to capture and track customer and subscription data, wherein data captured and tracked comprises any of customer identification data, including any of customer name, unique customer ID, customer contact person, email address for customer contact person; a unique identifier for a subscription program that said customer has purchased; and effective and expiration dates of said subscription program that said customer has purchased, including any of effective and expiration dates, including any of effective and expiration dates;
said repository configured to provide a renewals management module for enabling said software publisher or other seller of subscription services to establish automated business rules that define how, when, and to whom communications are sent to customers that have subscription renewals coming due; and
said repository configured to provide a communication module for communicating with said customer contact.

14. The apparatus of claim 13, further comprising:
a template, created by said software publisher or seller of subscription programs, that forms the basis of said communications that are sent to said customer contact.

15. The apparatus of claim 13, said means for capturing and tracking further comprising:
means for capturing other contacts that have been added since the original purchase of said subscription program, in addition to contact information retained for an original purchaser of said subscription program.

16. The apparatus of claim 15, wherein said additional contacts comprise end users of said subscription program who are added either by the software publisher or by an administrative user from the customer.

17. The apparatus of claim 15, wherein all contacts associated with a single purchasing customer are associated with a single customer record or account.

18. The apparatus of claim 13, said business rules comprising any of:
how soon prior to, or after, a subscription renewal is due that a renewal communication should be sent;
how many renewal communication messages are sent, and which contacts associated to a customer record (account) should receive these renewals communications;
whether said renewal communication message is sent directly to the customer contacts, or whether it is sent as a notification message to a sales representative at the software publisher of other seller of subscription services; and
which template should be used for the renewal communication notification.

19. The apparatus of claim 13, wherein said renewal communication message that is sent to the customer contact describes which subscription is due for renewal and a price for the subscription renewal term.

20. The apparatus of claim 13, said renewals management module further comprising:
means for delivering renewals information to a customer relations management system at the software publisher or other seller of subscription programs.

21. The apparatus of claim 20, further comprising:
means for completing said delivery in an automated way through any of use of APIs or web service calls.

22. The apparatus of claim 20, wherein said renewals information delivered to said customer relations management system comprises any of customer, contacts, subscription program details and expiration dates, and customer usage information comprising any of customer's product download history, license generation activity, and access to subscription services.

23. The apparatus of claim 13, further comprising:
a link that is provided with said renewals communications that directs the customer contact to a sales representative from the software publisher or other seller of subscription services, or to an online commerce store where the customer can provide payment information to complete an online sale and renewal of the subscription.

24. The apparatus of claim 13, further comprising:
means for automatically supplying online renewals sales information captured from the customer contact in a commerce module to said entitlement module; for applying new subscription data to a customer record; and for using updated customer subscription data for future renewals communication messaging when a subscription expiration is reached.

* * * * *